(12) United States Patent
Druck

(10) Patent No.: US 11,061,531 B2
(45) Date of Patent: Jul. 13, 2021

(54) SYSTEM AND METHOD FOR TOUCH-BASED COMMUNICATIONS

(71) Applicant: VERIZON MEDIA INC., New York, NY (US)

(72) Inventor: Aaron Druck, San Francisco, CA (US)

(73) Assignee: VERIZON MEDIA INC., New York, NY (US)

(*) Notice: Subject to any disclaimer, the term of this patent is extended or adjusted under 35 U.S.C. 154(b) by 0 days.

(21) Appl. No.: 16/560,343

(22) Filed: Sep. 4, 2019

(65) Prior Publication Data

US 2019/0392394 A1    Dec. 26, 2019

Related U.S. Application Data

(63) Continuation of application No. 13/680,588, filed on Nov. 19, 2012, now Pat. No. 10,410,180.

(51) Int. Cl.

| G06F 3/0481 | (2013.01) |
| G06F 3/01 | (2006.01) |
| G06F 3/041 | (2006.01) |
| G06F 3/0488 | (2013.01) |
| G06Q 10/10 | (2012.01) |
| G06Q 30/02 | (2012.01) |

(52) U.S. Cl.
CPC .......... *G06F 3/04817* (2013.01); *G06F 3/016* (2013.01); *G06F 3/041* (2013.01); *G06F 3/04883* (2013.01); *G06Q 10/107* (2013.01); *G06Q 30/0241* (2013.01); *G06F 2203/014* (2013.01)

(58) Field of Classification Search
None
See application file for complete search history.

(56) References Cited

U.S. PATENT DOCUMENTS

| 6,859,819 | B1 | 2/2005 | Rosenberg et al. |
| 7,159,008 | B1 | 1/2007 | Wies et al. |
| 7,484,176 | B2 | 1/2009 | Blattner et al. |
| 7,636,755 | B2 | 12/2009 | Blattner et al. |
| 7,647,560 | B2 | 1/2010 | Macauley et al. |

(Continued)

FOREIGN PATENT DOCUMENTS

| KR | 1020080080710 | 9/2008 |
| KR | 1020110131323 | 11/2011 |

(Continued)

OTHER PUBLICATIONS

International Search Report (PCT/US2013/065616) dated Jan. 22, 2014; 3 pages.

*Primary Examiner* — Amy M Levy
(74) *Attorney, Agent, or Firm* — James J. DeCarlo; Greenberg Traurig, LLP

(57) ABSTRACT

Disclosed is a system and method for an interactive communication experience on mobile devices. In general, the present disclosure discusses dynamically manipulating or modifying graphic user representations during an electronic communication. The modification or manipulation of these graphic user representations enables users to convey nuances of mood and feelings rather than being confined to conveying them through conventional communications, including text, images, video, or selecting an appropriate emoticon or avatar from a palette of predetermined emoticons or avatars.

17 Claims, 12 Drawing Sheets

(56) References Cited

U.S. PATENT DOCUMENTS

| | | | |
|---|---|---|---|
| 8,180,296 B2 | 5/2012 | Flaherty et al. | |
| 8,601,379 B2 * | 12/2013 | Marks | G06F 3/011 715/757 |
| 2001/0003189 A1 | 6/2001 | Miyazawa et al. | |
| 2003/0222874 A1 * | 12/2003 | Kong | H04L 51/00 345/473 |
| 2004/0179039 A1 * | 9/2004 | Blattner | H04L 51/00 715/758 |
| 2005/0216529 A1 | 9/2005 | Ashtekar et al. | |
| 2006/0064346 A1 | 3/2006 | Steenstra et al. | |
| 2006/0073816 A1 | 4/2006 | Kim et al. | |
| 2007/0033259 A1 | 2/2007 | Wies et al. | |
| 2008/0133648 A1 | 6/2008 | Grant et al. | |
| 2008/0153554 A1 | 6/2008 | Yoon et al. | |
| 2008/0218490 A1 | 9/2008 | Kim et al. | |
| 2009/0031000 A1 | 1/2009 | Szeto | |
| 2009/0158160 A1 * | 6/2009 | Alberth, Jr. | H04M 3/42 715/733 |
| 2009/0177981 A1 | 7/2009 | Christie et al. | |
| 2009/0327220 A1 | 12/2009 | Meijer et al. | |
| 2010/0099445 A1 | 4/2010 | Song et al. | |
| 2010/0281121 A1 | 11/2010 | Cheng et al. | |
| 2010/0299400 A1 | 11/2010 | Durand et al. | |
| 2011/0029892 A1 | 2/2011 | Kurtz et al. | |
| 2011/0047486 A1 * | 2/2011 | Jones | A63F 13/87 715/757 |
| 2011/0050601 A1 | 3/2011 | Son et al. | |
| 2011/0061019 A1 | 3/2011 | Cliff et al. | |
| 2011/0169622 A1 | 7/2011 | Billmaier et al. | |
| 2011/0171934 A1 | 7/2011 | Lim et al. | |
| 2011/0239143 A1 * | 9/2011 | Ye | G06F 3/048 715/764 |
| 2011/0264491 A1 | 10/2011 | Birnbaum et al. | |
| 2011/0296324 A1 | 12/2011 | Goossens et al. | |
| 2012/0011453 A1 | 1/2012 | Shimono et al. | |
| 2012/0020428 A1 | 1/2012 | Roth et al. | |
| 2012/0030038 A1 | 2/2012 | Russell et al. | |
| 2012/0059787 A1 | 3/2012 | Brown et al. | |
| 2012/0150970 A1 | 6/2012 | Peterson et al. | |
| 2012/0166665 A1 | 6/2012 | Martin | |
| 2012/0270578 A1 | 10/2012 | Feghali | |
| 2013/0024781 A1 | 1/2013 | Douillet et al. | |
| 2013/0091443 A1 | 4/2013 | Park et al. | |
| 2013/0194280 A1 * | 8/2013 | Kwon | G06T 13/40 345/473 |
| 2014/0007010 A1 | 1/2014 | Blom | |
| 2014/0052794 A1 | 2/2014 | Tucker et al. | |
| 2014/0136182 A1 * | 5/2014 | Bill | A63F 13/12 704/2 |
| 2014/0152758 A1 * | 6/2014 | Tong | H04M 1/72555 348/14.02 |
| 2015/0287403 A1 * | 10/2015 | Holzer Zaslansky | G10L 21/10 704/231 |

FOREIGN PATENT DOCUMENTS

| | | | |
|---|---|---|---|
| WO | 2004053830 A1 | 6/2004 | |
| WO | WO-2013152453 A1 * | 10/2013 | ......... G06K 9/00255 |

* cited by examiner

702 — Receive an input control signal associated with a chat message

704 — Cause a graphical user representation to be displayed with the chat message on a mobile communication device 706 — Provide a haptic effect associated with the chat message

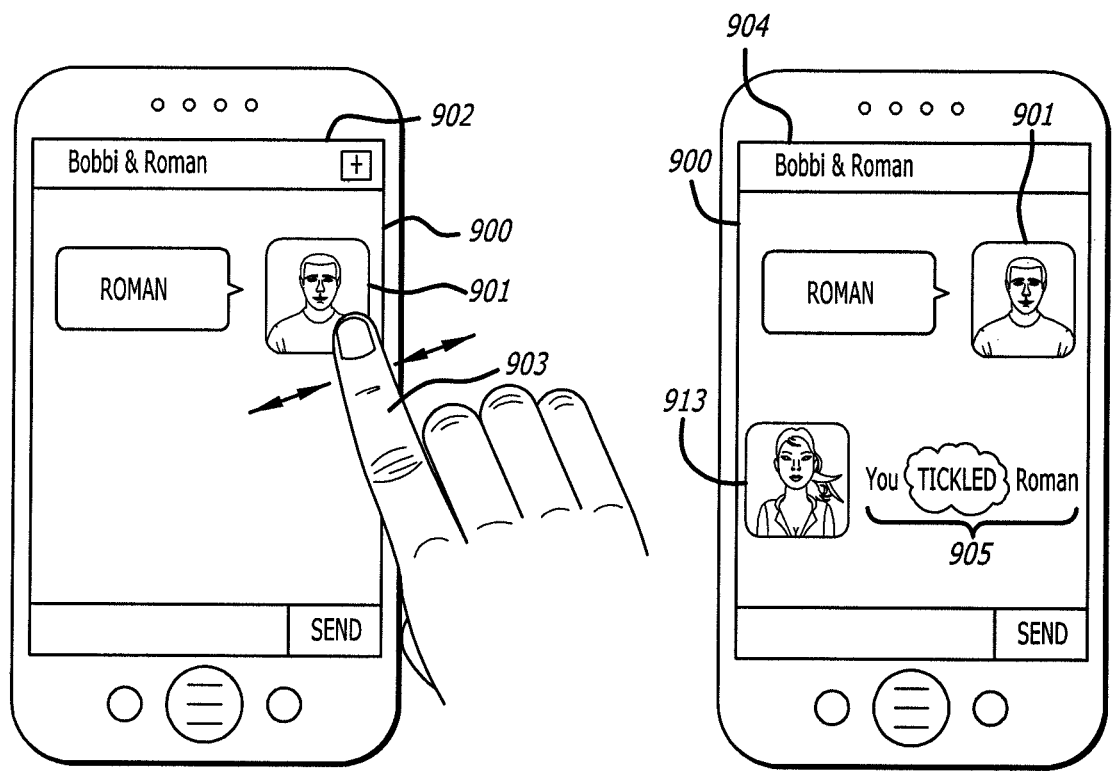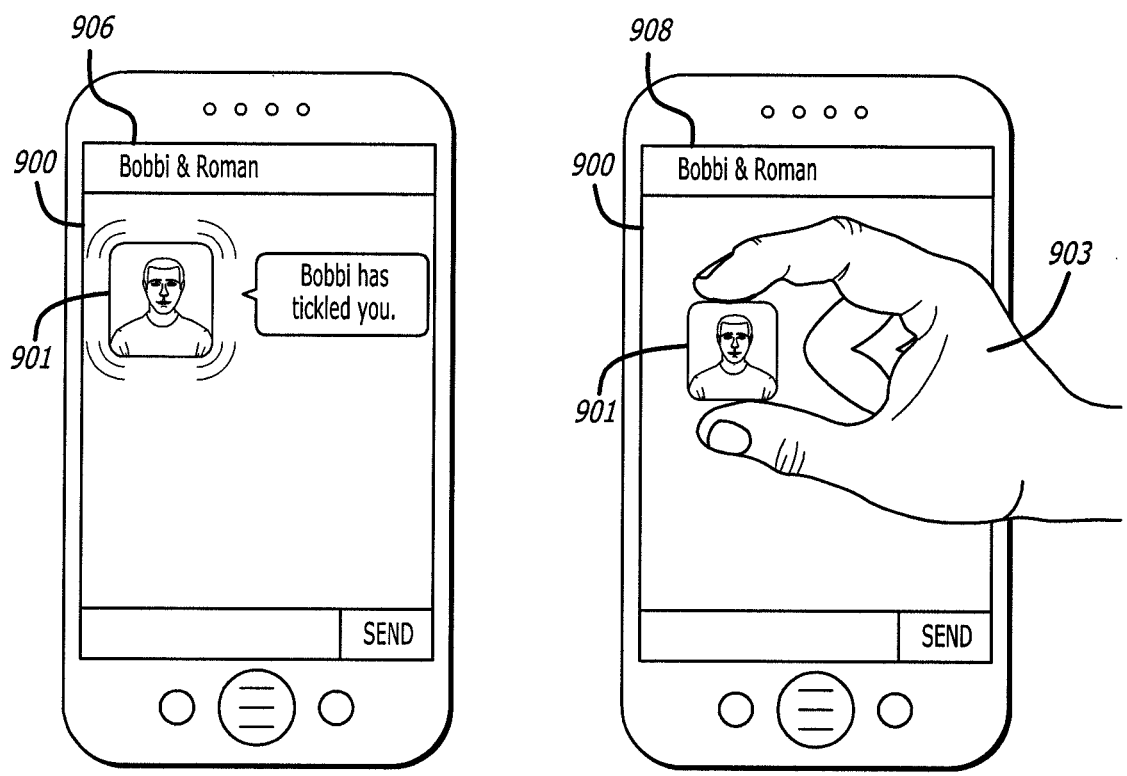
FIG. 9

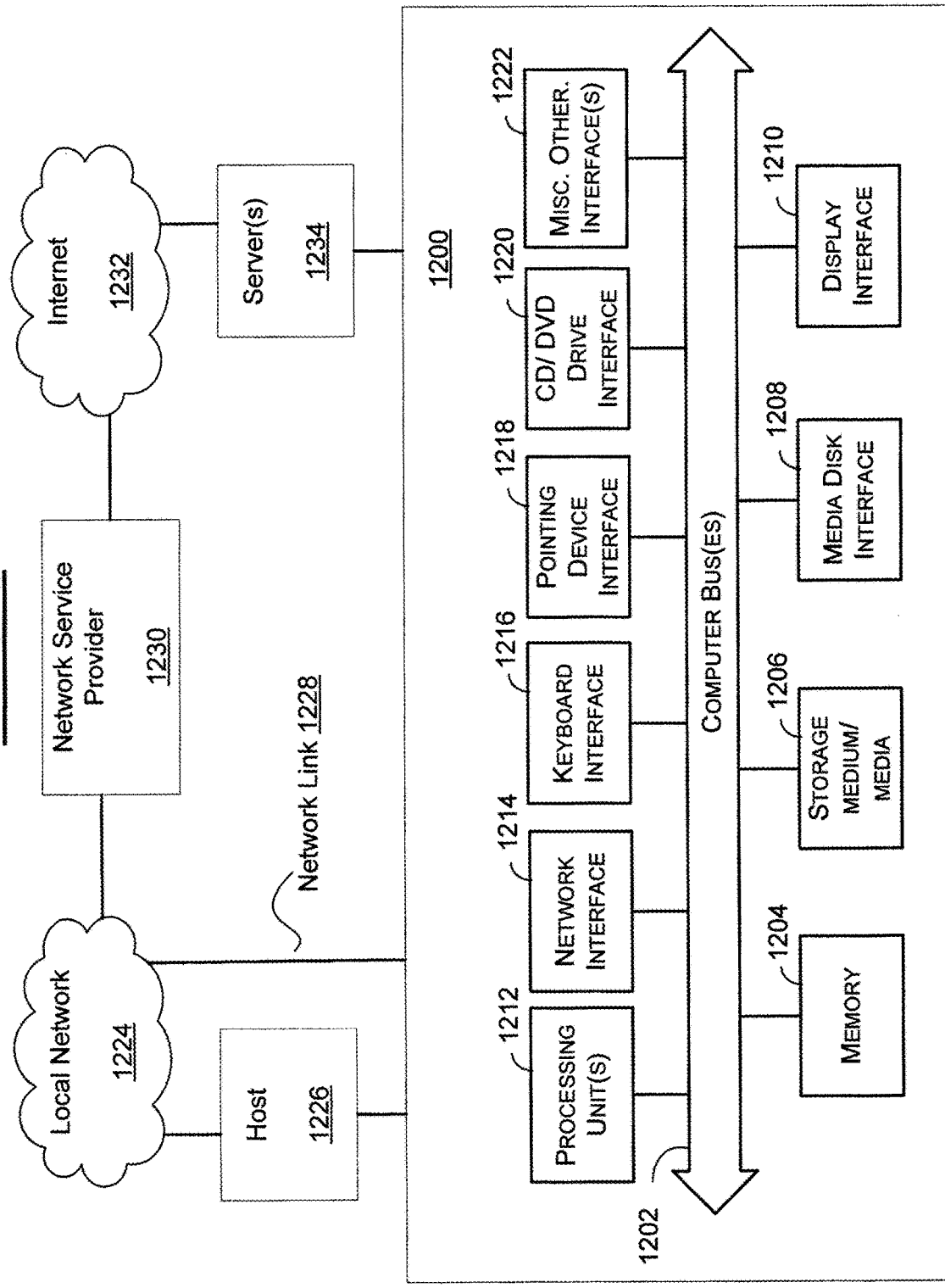

SYSTEM AND METHOD FOR TOUCH-BASED COMMUNICATIONS

This patent application claims the benefit of and is a continuation of U.S. patent application Ser. No. 13/680,588, filed on Nov. 19, 2012, which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever

FIELD

The present disclosure relates generally to customizable communications within messaging applications, and more particularly to dynamically manipulating graphic user representations during electronic communications in order to convey information to users of mobile communication devices.

RELATED ART

Mobile communication devices can provide users with various services such as voice calling, input/output services, and data storage. Mobile devices are also equipped with various complicated functions including capturing and/or modifying photos, audio and video, playing music and video files, providing game programs, receiving broadcast programs and providing wireless Internet services. Thus, mobile devices have evolved into multi-media players.

Mobile devices generally use auditory and visual cues to alert users when incoming messages are received. Mobile devices also can use vibratory alerts to alert users of incoming messages. Such alerts or cues are capable of simply providing users with notifications of incoming content.

SUMMARY

The present disclosure addresses failings in the art by providing a system and method for customizing or personalizing auditory, visual and vibratory alerts associated with user communications. That is, the present disclosure describes additional or new sensory modalities that deliver information to users of mobile devices in a personalized manner. Such sensory modalities enhance the reality of a user's experience in a virtual world. With the advent and mainstream usage of the touch screen interfaces on mobile devices, spatial senses affiliated with receiving electronic communications are unified. That is, touch capabilities combine the way a user navigates through the virtual world and communicates with other users by enabling a complete and personalized communication experience for users by combing sight, sound and touch with conventional communication protocol.

Generally, the present disclosure describes systems and methods for dynamically manipulating graphic user representations during an electronic communication, such as an instant message chat, SMS or other dialogue where users are instantaneously communicating over a network. Graphical user representations can be emoticons or avatars, but are not limited to such, as they can also be other types of images, graphics, icons, animations, and the like. The manipulation of these graphic user representations enables users to convey nuances of mood and feelings rather than being confined to conveying them through conventional communications.

In accordance with one or more embodiments, a method is disclosed which includes facilitating, over a network via a server computing device, visible display of a first graphical user representation associated with a first user of a first computing device and a second graphical user representation associated with a second user of a second computing device, the first and second graphical user representations being visibly displayed on the first and second computing devices in accordance with an instant messaging session between the first user and the second user; receiving, at the server computing device, an event signal from the first computing device, the event signal corresponding to input at the first computing device by the first user, the input comprising data indicative of the first user's interactions with the graphical user representation of the second user displayed on the first computing device during the instant messaging session; determining, via the server, an event based upon the interaction data within the event signal; generating, via the server, an event message for transmittal to the second computing device based upon the determined event, the event message comprising an action to be performed on the second computing device during the instant messaging session; and transmitting, from the server over the network, the event message to the second computing device for execution of the action during the instant messaging session.

In accordance with one or more embodiments, a non-transitory computer-readable storage medium is provided, the computer-readable storage medium tangibly storing thereon, or having tangibly encoded thereon, computer readable instructions that when executed cause at least one processor to dynamically manipulate graphic user representations during an electronic communication.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 7 is a flowchart of a process for interacting with an avatar using haptic technology in accordance with some embodiments of the present disclosure;

FIGS. 9-11 are non-limiting examples of communications in accordance with some embodiments of the present disclosure; and FIG. 12 is a block diagram illustrating architecture of a hardware device in accordance with one or more embodiments of the present disclosure.

DESCRIPTION OF EMBODIMENTS

Figure 1:
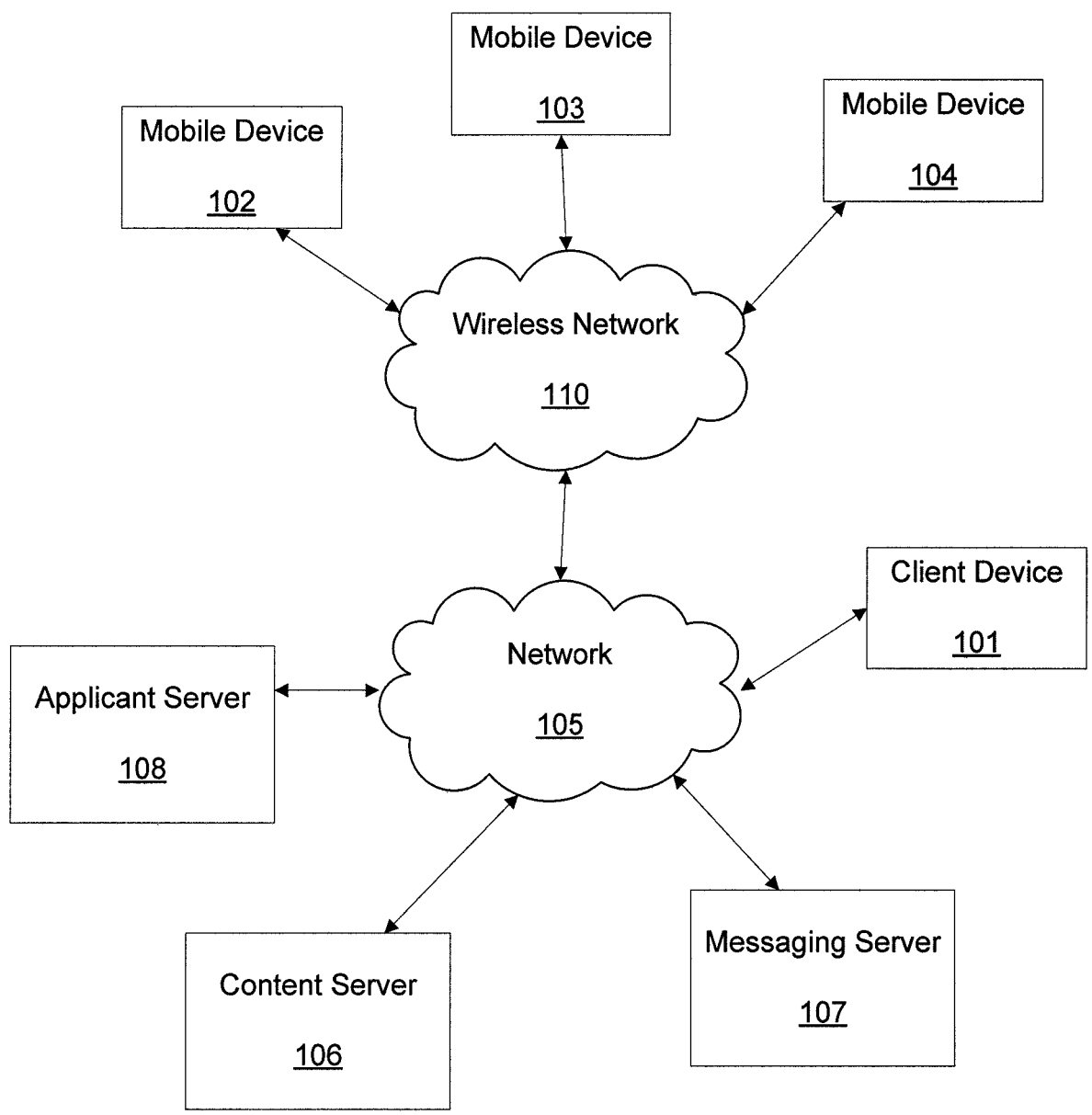
FIG. 1 depicts an example of a system architecture according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

As used herein, the terms "text message" or "text messaging" refer to Short Message Service (SMS) messaging, as well as a variety of other limited size messaging protocols, including, but not limited to Instant Messaging (IM), Multimedia Messaging Service (MMS), or an Enhanced Message Service (EMS) messaging protocols, among other known or to be known communication protocols.

For purposes of this disclosure, an electronic computing device, electronic device or computing device (also referred to as a client device, user device or mobile device) may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

An electronic device may include or may execute a variety of operating systems, including a personal computer operating system, such as a WINDOWS®, iOS® or LINUX®, or a mobile operating system, such as iOS®, ANDROID®, or WINDOWS MOBILE®, or the like. An electronic device may include or may execute a variety of possible applications, such as a client software application enabling communication with other devices, such as communicating one or more messages, such as via email, short message service (SMS), or multimedia message service (MMS), including via a network, such as a social network, to provide only a few possible examples. An electronic device may also include or execute an application to communicate content, such as, for example, textual content, multimedia content, or the like. An electronic device may also include or execute an application to perform a variety of possible tasks, such as chatting, texting, browsing, searching, playing various forms of content, including locally stored or streamed video, or games (such as fantasy sports leagues). The foregoing is provided to illustrate that claimed subject matter is intended to include a wide range of possible features or capabilities.

According to some exemplary embodiments, the electronic device used herein is a touch sensor device, referred to as a touch device. A touch device is a device that typically includes a sensing region that uses capacitive, resistive, inductive, optical, acoustic or other technology to determine the presence, input (or depression), proximity, location and/or motion of one or more fingers, styli, pointers, and/or other objects. The touch device can be operated via input with one or more fingers styli, pointers and/or other objects, and can be used to provide an input to the electronic system, such as a desktop, tablet, notebook computer and smartphone, as well as kiosks and other terminals. As understood in the art, the touch device receives input not only when a user's finger(s) contacts the display screen of the touch device, but also when the user's finger(s) or other object(s) is within a detected proximity to the display screen of the touch device. Thus, the sensing region of the touch device can function as a cursor control/pointing device, selection device, scrolling device, graphics/character/handwriting input device, menu navigation device, gaming input device, button input device keyboard and/or other input device.

Although the embodiments discussed herein are described with reference to a touch device, other embodiments exist where the device is a computing device comprises, or is coupled to, a display screen where inputs are registered via a pointer (via a mouse), keyboard entry, or other inputs generally understood to register commands on a traditional computing device.

In addition, as discussed herein, exemplary embodiments occur within a GUI displayed on a touch device. However, it should be understood that any array of electronic devices can be used. Such devices, referred to as a client (or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

In various embodiments, the touch device provides a GUI for controlling a visual computing environment that represents programs, files, and options with graphical images, such as icons, menus and dialog boxes on the display screen of the touch device. Graphical items defined within the GUI can provide software routines which are handled by the GUI. Therefore, the GUI can report and act upon a user's actions respective of the graphical items. A GUI is a window, all of or a defined area of a display that contains distinguishable text, graphics, video, audio and other information for output.

The touch device can employ a touch screen interface, as discussed in FIGS. 3-4 below. The touch screen interface combines the functionality of the GUI displayed on the display screen of with the touch device with the touch device's capabilities to recognize a sensed input. With most sensing technologies (e.g. capacitive, resistive, and inductive), a touch sensor is stacked with the display screen and sensor elements (e.g. electrodes) are located above, below, or within the display screen elements. Other technologies (e.g. surface acoustic wave and optical) may position the sensor elements elsewhere, but at least part of the sensing region overlaps with the display screen. The resulting combination is usually referred to together as a "touch screen." A touch screen can provide a multi-purpose interface that can function both as a display and as an input device. Furthermore, because virtual touch screen controls can replace some physical input controls, the touch screen can extend to areas of a device typically reserved for other input devices.

The preferred embodiments of the present disclosure will now be described with reference to FIGS. 1-12. The present disclosure provides systems and methods for an interactive communication experience on mobile devices. In general, the present disclosure discusses dynamically manipulating or modifying graphic user representations during an electronic communication, such as an instant message chat, SMS or other dialogue where users are instantaneously communicating over a network. Graphical user representations can be emoticons or avatars, but are not limited to such, as they can also be other types of images, graphics, icons, animations, and the like. Additionally, the implementation and interaction with graphical user representations is not limited to the representations as a whole, as some embodiments exist where manipulation and interaction of graphical user representations involves a portion or portions of the representations. The modification or manipulation of these graphic user representations enables users to convey nuances of mood and feelings rather than being confined to conveying them through conventional communications, including text, images, video, or selecting an appropriate emoticon or avatar from a palette of predetermined emoticons or avatars.

One type of graphical user representation is an emoticon. Emoticons are small, typically simplistic, images representing a user's facial expression or current mood. For example, a "smiley face" as is an emoticon used to signal that the writer of the message is smiling or happy. In another example, a "sad face" is an emoticon conventionally used to signal that the writer of the message is unhappy or displeased. These emoticons therefore enable the recipient of a message to better understand the tenor of the writer's message.

Another type of graphical user representation, which is used in an exemplary but non-limiting manner in the present disclosure, is an avatar. An avatar is frequently used on the Internet or in gaming to represent a particular user. An avatar may include a picture or other images associated with a user, or an animated character in the context of an application. An application can be a computer-implemented game, a productivity application (such as a calendar or word processor), a communications application (such as email or chat), a social networking application, and any other suitable application. The application may be a web-based or network application implemented in connection with a web browser, or a stand-alone application hosted on a client device (or server). For example, an application can be an instant messaging chat application natively supported by a mobile device. In particular embodiments, an avatar may be a graphic icon representing a user in a computer user interface provided by an application. In some embodiments, an avatar may be a photographic picture representing a user.

Typically, graphical user representations, such as emoticons and avatars, are preselected from a predetermined set or palette of prefabricated images, graphics or icons. Because the user is confined to select his or her emoticon or avatar from a finite number of possible emoticons or avatars, the user is unable to convey personalized/customized nuances in mood or feeling. The present disclosure remedies these shortcomings by enabling a user to manipulate and/or tailor a graphical user representation in order to appropriately convey desired information.

By way of background, online services may provide users with the ability to send and receive instant messages, such as, for example, SMS messages. Instant messages are private online conversations between two or more people who have access to an instant messaging service, such as those who have installed communications software necessary to access and use the instant messaging service, and/or those who each generally have access to information reflecting the online status of other users. An instant messaging sender may send self-expressed items to a recipient. Such self-expressed items can include emoticons and avatars. However, there is always an emotional disconnect. That is, one person can chat (i.e., talk or text) with another person; however, there remains an emotional barrier between each user.

The present disclosure discusses the use of touch screens and mobile hardware to facilitate stronger communications and connections between users. Touch and mobile devices, as discussed below in relation to FIGS. 3-4, include hardware accelerometers, gyroscopes, vibrations and other feedback systems. These feedback systems, such as those incorporating haptic technology, can be utilized to make physical connections, such as those synonymous with shaking someone's hand or hugging your friend. Thus, based on these capabilities, graphical user representations, such as emoticons and avatars, can be used to convey mood and emotion. That is, the user representations can be dynamically manipulated, e.g., by squeezing, rotating, tapping, pinching, distorting, coloring, and the like, to convey specific information related to a mood, emotion or particular statement. Additionally, user representations can also be manipulated by shaking, tilting, spinning, and the like, the user's mobile device. This enables a user to customize or tailor an existing graphical user representation to better reflect the user's current mood or emotion, and even convey a message comprising such information related to a mood, emotion or statement.

Figure 10:
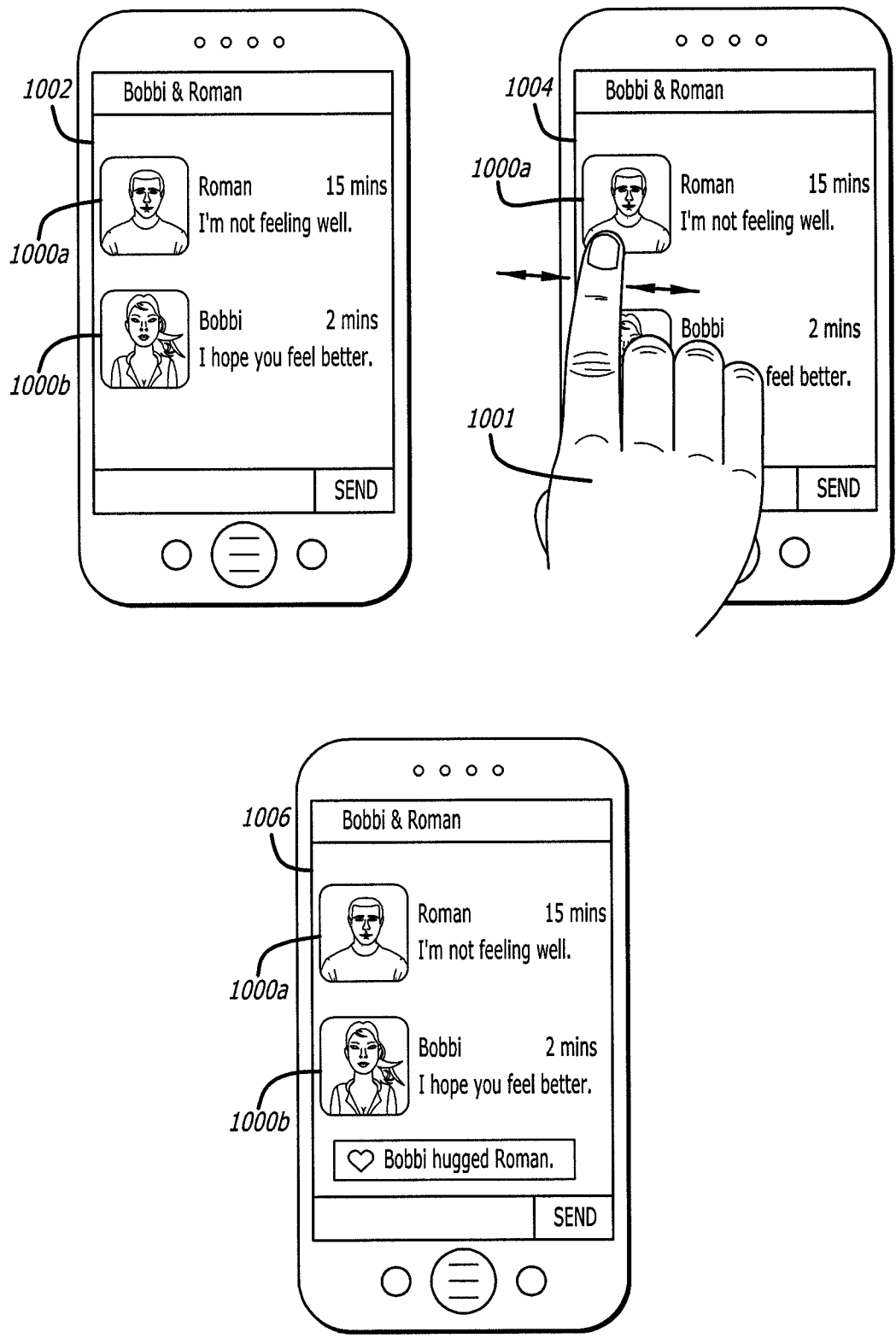
Figure 11:
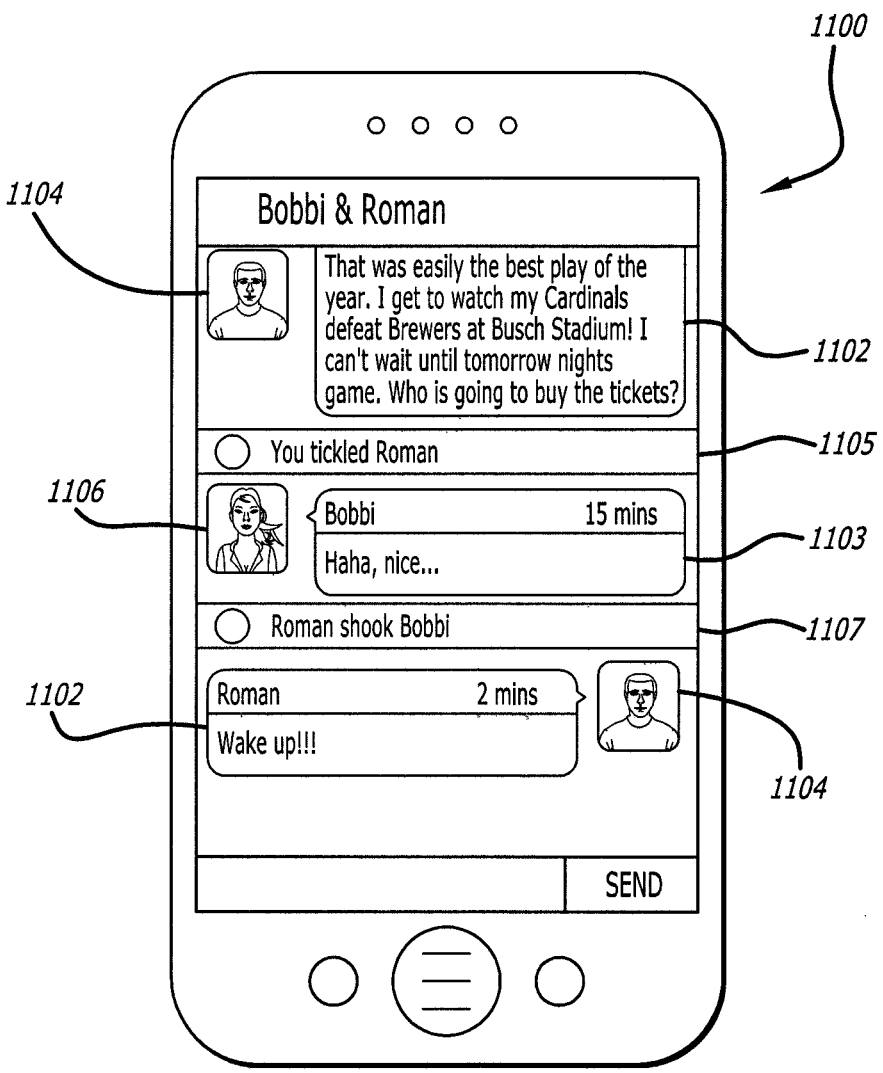

In a non-limiting exemplary example in accordance with the examples illustrated in FIGS. 9-11, a user, Bobbi, is having a conversation with another user, Andreas. The conversation is a text conversation occurring over an instant messaging platform, such as, for example, iMessage™ on iOS® via each user's iPhone®, or in another example, over Yahoo! Messenger® on a user's mobile device. It should be understood that an instant messaging session can be supported by application programs native to users' devices, and in some embodiments, web-enabled application programs. Also, it should be understood, as currently provided by messaging applications, avatars, emoticons, or other images are displayed within the chat user interface, as discussed below and illustrated in FIGS. 9-11.

In the conversation, Bobbi has just learned that Andreas is not feeling well. In an attempt to cheer up Andreas, Bobbi can manipulate a displayed avatar to create an expression to be communicated to Andreas. For example, Bobbi can place her thumb on her touch screen in relation to Andreas' displayed avatar, and wiggle her thumb. In some embodiments, this can create a "tickle" affect. Thus, as a result, on Andreas' phone, her displayed avatar will shake slightly on the screen. Additionally, Andreas' phone may also shake slightly as a result of the "tickle" creating a haptic effect. This effect can occur simultaneously with the animation or according to another sequence under the directive of pre-configured or selected instructions by the system, user or combination thereof. In some embodiments, a notification, such as an emoticon notice, can appear on Andreas's device with an icon that says "you have been tickled." In some embodiments, a notification or acknowledgement may also appear on Bobbi's phone stating "you have tickled Andreas." Additionally, in some alternative embodiments, instead of interacting with Andreas' avatar, Bobbi can type the words "tickle" which can trigger the "tickle" effect discussed above. Therefore, instead of Bobbi being limited to simply sending a message implying a joke or request for Andreas to feel better, or even selecting a conventional static emoticon or avatar from a predefined library that resembles a similar connotation, Bobbi can personalize an expression and realize such expression though direct interaction with her mobile device.

It should be understood from the below discussion that the input and output from user interactions with a touch screen and avatar are not limited to those discussed in the examples herein, as the examples are non-limiting and merely discussed to portray embodiments and capabilities of the present disclosure. For example, users can interact with their mobile device's touch screen interface in all known and to be known manners, as discussed below.

FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, messaging server 107 and application (or "App") server 108.

One embodiment of mobile devices 102-103 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC®), Jabber®, email, or the like, between another computing device or server. However, the present disclosure is not limited to these messaging protocols, and virtually any other messaging protocol may be employed.

Mobile devices 102-104 may be configured further to include a client application that enables the end-user to log into an end-user account that may be managed by another computing device, such as content server 106, messaging server 107 and/or application server 108. Such end-user account, for example, may be configured to enable the end-user to receive emails, send/receive IM messages, SMS messages, access selected web pages, or the like. However, the disclosure is not constrained, and in one embodiment, the end-user might not need to log into an account to send/receive messages.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple messaging server 107, content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content server 106, messaging server 107, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Accordingly, in some embodiments, the present disclosure may be utilized via a peer-to-peer network. In some embodiments, the peer-to-peer network may be embodied through a content distribution network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

According to some embodiments, the present disclosure may also be utilized within a social network. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks.

In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

The content server 106 may include a device that includes a configuration to provide content via a network to another device. A content server 106 may, for example, host a site, such as a social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Messaging server 107 includes virtually any computing device that is configured to provide one or more messaging services. For example, messaging server 107 may provide Instant Messaging (IM) services, email services, VOIP services, SMS services, FTP services, or the like. Messaging server 107 may be implemented on a variety of computing devices including personal computers, desktop computers, multiprocessor systems, microprocessor-based devices, network PCs, servers, network appliances, or the like. Moreover, although messaging server 107 is illustrated as a single network device, the disclosure is not so limited. For example, one or more of messaging servers may also be implemented using a plurality of network devices to provide the various messaging services. According to some embodiments, messaging server 107 may be configured to receive messages from a sending device, such as client devices 101-104, or the like, and provide the message, and/or a copy of the message to content server 106 for analysis. Furthermore, messaging server 107 may similarly receive a link to context, in one embodiment, from content server 106, and provide the link or link information along with a response message to the original sending device. In another embodiment, messaging server 107 may forward the response message to content server 106, and receive the response message, or a response message modified with the link information to the contextual message.

Server 108 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by the content, message and application servers 106, 107 and 108. This may include in a non-limiting example, social networking services servers, SMS servers, IM servers, MMS servers, email servers, exchange servers, photo-sharing services servers, and travel services servers, via the network 105 using their various devices 101-104. In some embodiments, applications, such as an instant messaging application, can be hosted by the application server 108. Thus, the application server 108 can store various types of applications and application related information including user profile information in an application database, which is associated with the application server 108.

Moreover, although FIG. 1 illustrates content server 106, messaging server 107 and application server 108 as single computing devices, respectively, the disclosure is not so limited. For example, one or more functions of content server 106, messaging server 107 and/or application server 108 may be distributed across one or more distinct computing devices. Moreover, in one embodiment, content server 106, messaging server 107 and application server 108 may be integrated into a single computing device, without departing from the scope of the present disclosure.

Figure 2:
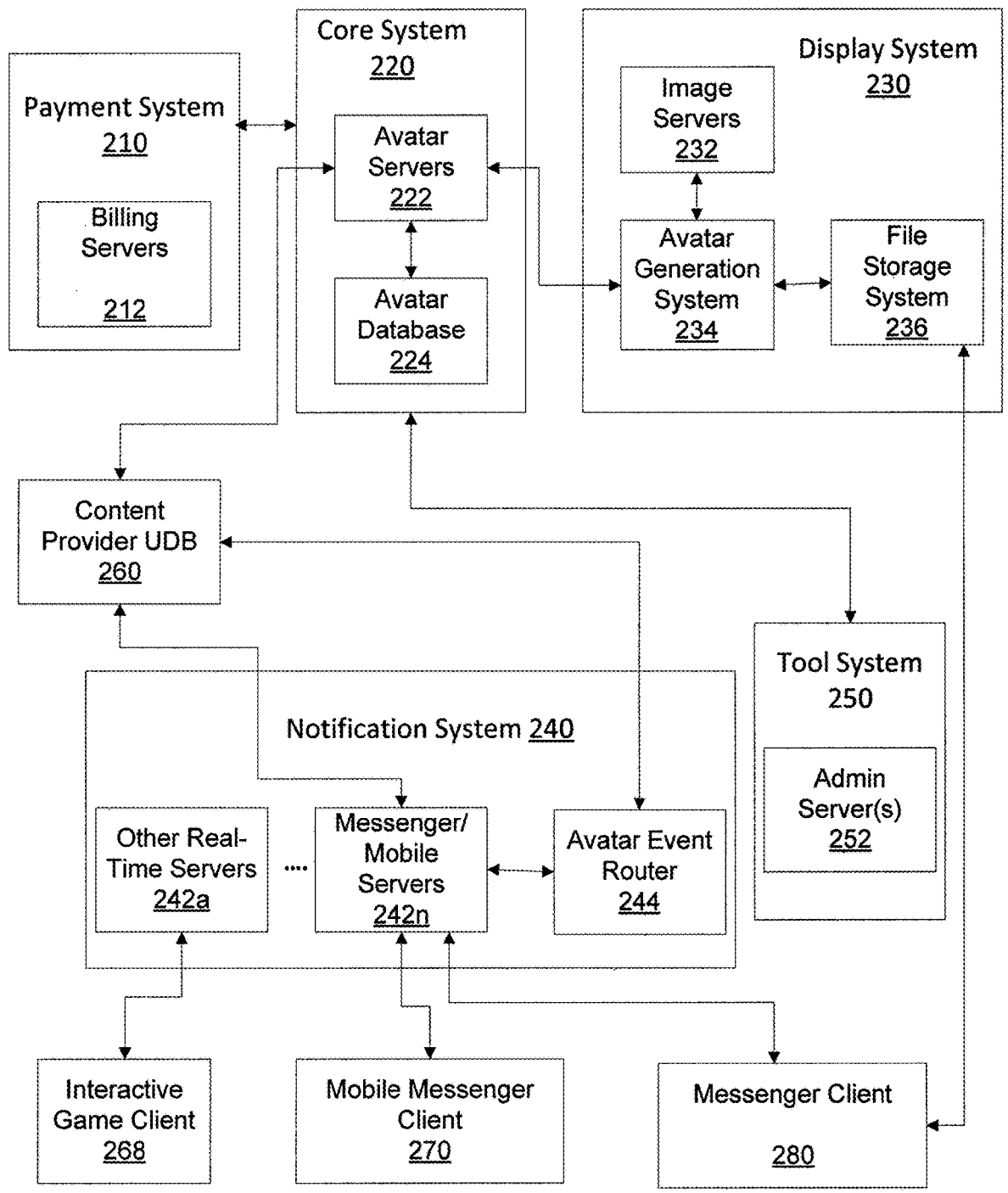
FIG. 2 illustrates exemplary architecture of a system for managing manipulation of graphical user representations in accordance with some embodiments of the present disclosure.

FIG. 2 illustrates an exemplary architecture of a system 200 for managing, updating and communicating customizations and manipulations of graphical user representations in accordance with some embodiments of the present disclosure. The system 200 comprises a payment system 240, a core system 220, a display system 230, a notification system 240, a tool system 250, and a user database associated with a content/service provider (UDB) 260. Although the present system is illustrated as comprising a plurality of separate systems, the present disclosure is not so limited. Namely, greater or lesser number of systems can be deployed to perform the functions as described below. In fact, various systems as described below can be omitted if the functions supported by these systems are not deployed for a particular implementation. Additionally, although the user database (UDB) 260 is illustrated as a separate module, the present disclosure is not so limited. Namely, the user database (UDB) 260 can be deployed or distributed within one or more of the above systems.

In some embodiments, a payment system is optionally employed. For example, the payment system employs one or more billing servers 242 that allow users to purchase points in bulk. The purchased points can be used to purchase items such as special accessories or emotions, e.g., from an avatar store, for the users' online identities. Thus, a user may charge his or her credit card via the payment system to purchase "n" points that can be spent on avatar items. In one embodiment, the payment system 240 is extensible to support integration with third party billing, e.g., telephone/text charge billing and/or internet service billing.

Indeed, various monetization techniques or models may be used in connection with sponsored advertising, including advertising associated with user chats, communications and messages, and non-sponsored chat advertising, including graphical or display advertising. In an auction-based online advertising marketplace, advertisers may bid in connection with placement of advertisements, although many other factors may also be included in determining advertisement selection or ranking Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties. Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics.

In some embodiments, the core system 220 comprises one or more dedicated servers 222 for processing and handling avatar operations. For example, the core system 220 serves as the main entry points for users to browse and select items to purchase and wear for their avatars. The core system also comprises an avatar database 224 for holding avatar site data stored in a relational database and user data, stored in the User Database 260. For example, as discussed below, the core system 220 can embody an event server and/or event database (or avatar database) which includes information related to animations of avatars and/or haptic effects related to interactions with avatars. Such embodiments are discussed in more detail below.

In some embodiments, the display system 230 comprises one or more generation servers 234 and one or more image servers 232, where these servers are tasked with the generation and display of the avatars (or other graphical user representations). As discussed above, for ease of explanation, avatars will be discussed as an exemplary graphical user representation; however, it should be understood that any type of image, graphic, animation or file may be utilized in connection with the systems and methods discussed herein. For example, the display system 230 can either fetch avatar files from the storage system 236, or generate them on the fly, caching the results on the storage system 236. The storage system 236 may also keep pre-generated avatar files for other services (e.g., provided by a service provider) to obtain through a web interface.

In some embodiments, the notification system 240 comprises one or more real time servers 242*a-n*, and at least one router 244 for routing avatar events. In operation, the avatar event router 244 in conjunction with messenger or mobile servers determines if an avatar user is logged into a real time messaging (or notification) service. If the query is positively answered, then the avatar event router 244 will pass notifications to the pertinent servers (242a-n) as required. To illustrate, if the user's avatar has experienced a change (e.g., a mood change, a clothing change, a background change, an accessory change and so on) and the user is logged into a real time messaging service, then the avatar change is sent via the notification system so that the change is presented in real-time. For example, FIG. 2 illustrates messenger/mobile servers 242n sending an avatar change notification to a mobile instant messenger client 270, for displaying an updated avatar to a mobile device and/or to a messenger client 280 for displaying an updated avatar to an instant messenger application, e.g., running on a mobile device.

In some embodiments, the tool system 250 comprises one or more administration servers 252 for performing production, maintenance, and/or customer care functions. In one embodiment, the administration servers 252 may also allow third parties to submit content for approval, e.g., new representations (images and/or animation) of avatars, new accessories for avatars, new moods for avatars, new services for avatars, and so on. The tool system 250 allows the service provider to evaluate the submitted contents provided by third parties and to allow the service provider to update, modify or remove old contents. Finally, it should be noted that the system 200 is only exemplary, and can be modified to suit the requirement of a particular implementation.

In some embodiments, users are given limited free avatar customization abilities, and can then buy new animations, or combinations of hairstyles, clothes, accessories, and backgrounds for their avatar through a web-based storefront. In one embodiment, avatars are integrated into the Messenger client in an instant-message (IM) window and/or Friend List, e.g., a Yahoo!® IM window. Users may express themselves online with multiple moods and/or gestures. In some embodiments, users may customize their avatars by buying points that can then be spent on avatar animations, outfits, accessories, and backgrounds. Customization may take place through a web-based interface, and once complete, can be displayed through the Messenger, Mobile or Games client(s).

FIG. 2 illustrates a block diagram depicting an exemplary embodiment of a real-time notification system in accordance with one or more aspects of the present disclosure. To illustrate, whenever a user creates a new avatar or modifies/manipulates/changes an existing avatar, the avatar core servers 222, write the user's avatar to a service provider's unified database 260, e.g., the Yahoo!® UDB. The avatar event router 244, which is continuously listening for any changes to a user's record in the UDB 260 for avatar related information, picks up the avatar change notification. The avatar event router 244 sends the avatar information to the pertinent messenger and mobile servers 242n, which then look up the user's messenger/mobile connection information and send an "avatar changed" event to the user himself and also to anyone who is interacting with the user, is logged into Messenger, and/or has the user in his/her buddy or contact list.

In some embodiments, when the Messenger client, e.g., 280 receives an avatar change notification, the client caches the avatar key of the user and downloads the pertinent size (e.g., small, medium and large) of the avatars from the appropriate avatar platform where the user created his avatar. Once the small, medium and/or large avatars are downloaded on the client, the client shows the small avatar of the user in the messenger buddy list and the medium avatar of the user at the top of the Messenger client. It should be understood that the small, medium and/or large avatars may be local to a client device; therefore the avatar change notification can be handled locally by a client device. If the user is having a Messenger conversation with another user, the full avatar can be shown in the Messenger conversation (e.g., IM) window.

Figure 3:
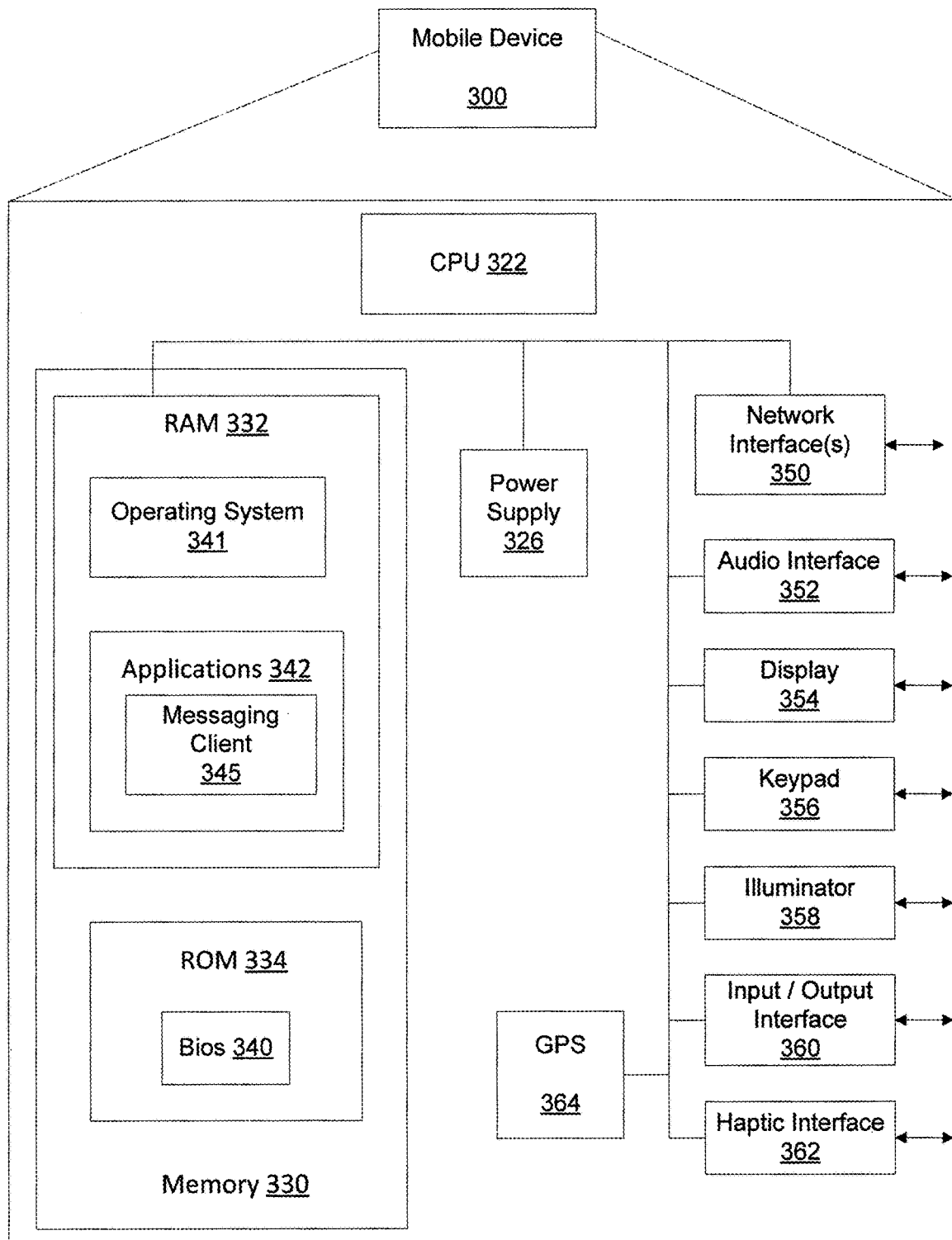
FIG. 3 depicts an embodiment of a mobile device according to some embodiments of the present disclosure.

FIG. 3 shows one embodiment of mobile device 300 that may be utilized within the present disclosure. Mobile device 300 may include many more or less components than those shown in FIG. 3. However, the components shown are sufficient to disclose an illustrative embodiment for implementing the present disclosure. Mobile device 300 may represent, for example, mobile devices 102-104 of FIG. 1.

As shown in the figure, mobile device 300 includes a processing unit (CPU) 322 in communication with a mass memory 330 via a bus 324. Mobile device 300 also includes a power supply 326, one or more network interfaces 350, an audio interface 352, a display 354, a keypad 356, an illuminator 358, an input/output interface 360, a haptic interface 362, and an optional global positioning systems (GPS) receiver 364. Power supply 326 provides power to mobile device 300. A rechargeable or non-rechargeable battery may be used to provide power. The power may also be provided by an external power source, such as an AC adapter or a powered docking cradle that supplements and/or recharges a battery.

Mobile device 300 may optionally communicate with a base station (not shown), or directly with another computing device. Network interface 350 includes circuitry for coupling mobile device 300 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 350 is sometimes known as a transceiver, transceiving device, or network interface card (NIC).

Audio interface 352 is arranged to produce and receive audio signals such as the sound of a human voice. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Mobile device 300 also comprises input/output interface 360 for communicating with external devices, such as a headset, or other input or output devices not shown in FIG. 3. Input/output interface 360 can utilize one or more communication technologies, such as USB, infrared, Bluetooth™, or the like. Haptic interface 362 is arranged to provide tactile feedback to a user of the client device. For example, the haptic interface may be employed to vibrate mobile device 300 in a particular way when the mobile device 300 receives a communication from another user.

Haptic technology refers to technology which interfaces to the user via the sense of touch by applying forces, vibrations and/or motions to the user. This mechanical stimulation may be used to assist in the creation of virtual objects (e.g., objects existing in a computing environment), for control of such virtual objects, and to enhance the control of machines and devices (e.g., mobile terminals). The implementation of haptic technology will be discussed in detail below with reference to FIGS. 4 and 6-8. Additionally, although the haptic effects related to vibrations are discussed herein, it should be understood that the effects of the present disclosure are not limited to vibratory pulses or effects, in that, auditory and/or visual effects can be output either alone or in combination with the vibrations (and/or animations).

Optional GPS transceiver 364 can determine the physical coordinates of mobile device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of mobile device 300 on the surface of the Earth. It is understood that under different conditions, GPS transceiver 364 can determine a physical location within millimeters for mobile device 300; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of mobile device 300. The mass memory also stores an operating system 341 for controlling the operation of mobile device 300. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 330 further includes one or more data stores, which can be utilized by mobile device 300 to store, among other things, applications 342 and/or other data. For example, data stores may be employed to store information that describes various capabilities of mobile device 300. The information may then be provided to another device based on any of a variety of events, including being sent as part of a header during a communication, sent upon request, or the like. At least a portion of the capability information may also be stored on a disk drive or other storage medium (not shown) within mobile device 300.

Applications 342 may include computer executable instructions which, when executed by mobile device 300, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 342 may further include messaging client 345 that is configured to send, to receive, and/or to otherwise process messages using SMS, MMS, IM, email, VOIP, and/or any of a variety of other messaging communication protocols. Although a single messaging client 345 is illustrated it should be clear that multiple messaging clients may be employed. For example, one messaging client may be configured to manage SMS messages, where another messaging client manages IM messages, and yet another messaging client is configured to manage emails, or the like.

Figure 4:
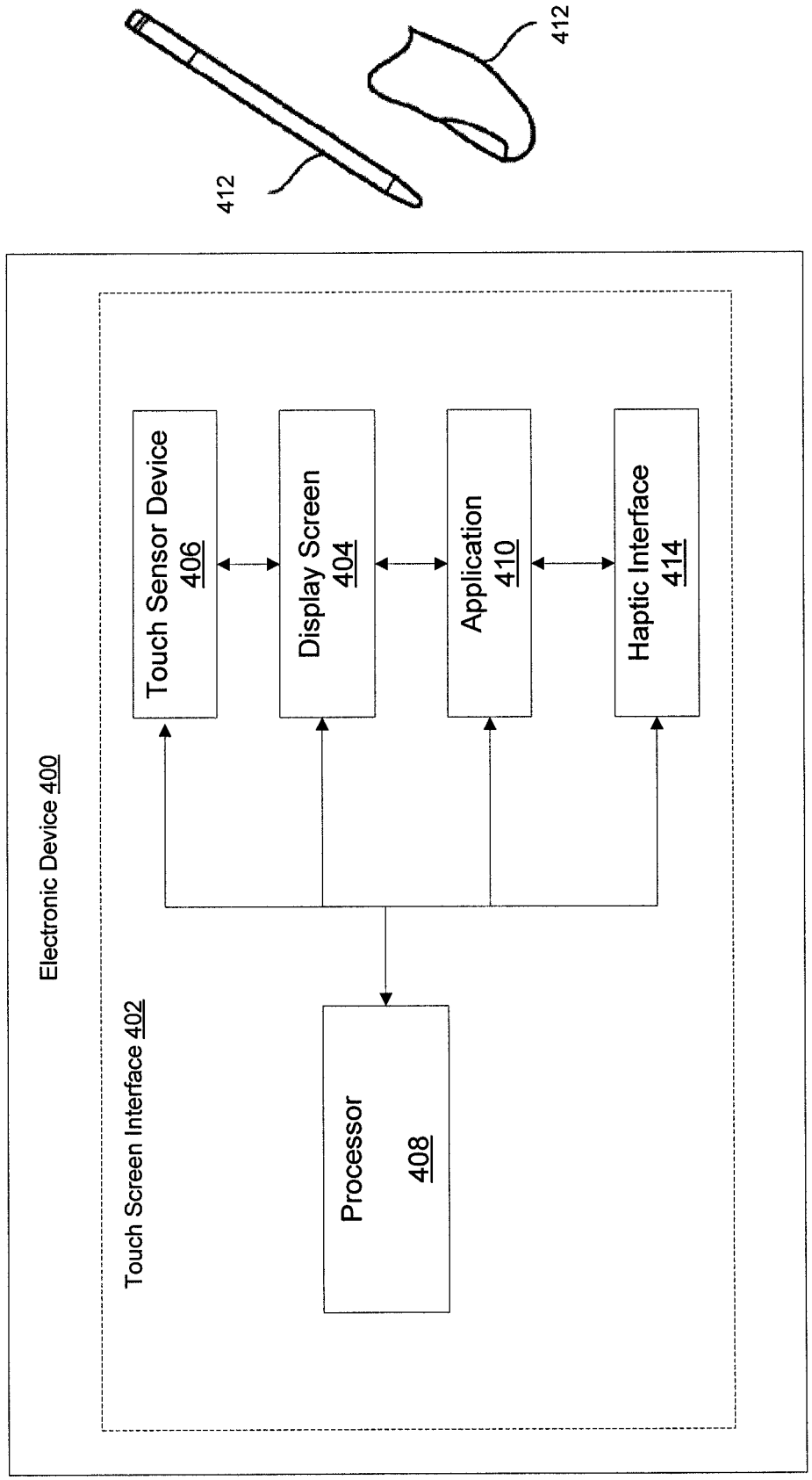
FIG. 4 is a block diagram of a mobile touch device in accordance with some embodiments of the present disclosure.

FIG. 4 is a block diagram of an exemplary electronic device 400 (or system) that is coupled to a touch screen interface 402 for use in an exemplary embodiment of the present disclosure. Touch screen interface 402 can be implemented as part of a larger electronic system, or coupled to electronic device 400 using any suitable technique. For example, touch screen interface 402 can be communicably coupled to electronic device 400 through any type of channel or connection, including serial, parallel, 12C, SPI, PS/2, Universal Serial Bus (USB), Bluetooth, RF, IRDA, or any other type of wired or wireless connection to list several non-limiting examples. Similarly, the various elements of electronic device 400 (e.g. processing components, circuitry, memory, casing materials, physical hardware, and the like) can be implemented as part of an overall system, as part of touch screen interface 402, or as a combination thereof.

The term "electronic device" is used to refer broadly to any type of device that communicates with a "touch screen interface." As discussed above, the electronic device 400 can be a mobile device, and thus comprise any type of device or devices in which touch screen interface 402 can be implemented in or coupled to. As non-limiting examples, electronic device 400 can comprise any type of personal computer, portable computer, workstation, tablet, smartphone, personal digital assistant, video game player, communication device, media device, an input device, or a combination thereof. These examples are meant to be representative and broadly construed. Also, it should be understood that the terminology "electronic device" and "mobile device" are interchangeable with respect to their terms of capabilities or features.

For example, communications devices can include wired phones, wireless phones, and electronic messaging devices; input devices include touch sensors such as touch screens and touch pads, keypads, joysticks and mice, and remote controls; media devices recorders and players include televisions, music recorders and players, and set-top boxes such as cable descramblers and video recorders or players; and combination devices include cell phones with built-in cameras, PDAs that can double as electronic messaging systems or cell phones, and the like. In some embodiments, electronic device 400 can be itself a peripheral to a larger system, and communicates with another device (in addition to the touch screen interface 402) using a suitable wired or wireless technique. Examples of peripherals include a remote control for a television, set-top box, or music system, a terminal on a wired network, and a media device capable of downloading media wireless from a separate source. Accordingly, the various embodiments of electronic device 400 may include any type of processor, memory, display, or other component as appropriate, and the elements of device 400 may communicate via a bus, network, or other wired or wireless interconnection as applicable. Additionally, electronic device 400 can be a host or a slave to touch screen interface 402. The interactions involving one or more users and electronic device 400 can also take place on additional non-touch screen devices such as a mouse cursor and a traditional computer monitor.

The touch screen interface 402 includes a display screen 404 and a touch sensor device 406, both of which are communicably coupled to processor 408. Display screen 404 is any type of electronic display capable of displaying a visual interface to a human user, and can include any type of LED, CRT, LCD, plasma, or other display technology. Touch sensor device 406 is sensitive to some aspect of object motion of one or more input objects 410 such as fingers and styli in its sensing region.

It should be noted that although the various embodiments described herein refer to "touch sensor devices," "proximity sensors," or "touch pads," these terms as used herein are used synonymously herein, and intended to encompass not only conventional touch sensor devices, but also a broad range of equivalent devices that are capable of detecting positional information about one or more fingers, pointers, styli and/or other objects. Such devices may include, without limitation, touch pads, touch tablets, biometric authentication devices, handwriting or character recognition devices, and the like. Thus, the interactions between one or more users and touch screen interface 402 could include a touch screen interface 402 with a touch sensor device 406 and one or more fingers, styli, other input objects 412, or a combination thereof.

In touch screen interface 402 of electronic device 400, processor 408 is coupled to touch sensor device 406, display screen 404 and haptic interface 414 (as discussed above in FIG. 3 in relation to item 362). Generally, processor 408 receives electrical signals from touch sensor device 406, processes the electrical signals, and communicates with a display screen 404. As discussed below, the processor 408 is operative to download, install and/or run application 410 which provides the capability to communication over a network. The application 410 is implemented, or executed, by the processor 408 through interactions with the touch sensor device 406. For example, application 410 can be an instant messaging program utilized by the device 400 to communicate with other users. Also, the application 410 can be utilized to load, render and/or download graphical user representations. Processor 408 would also typically communicate with electronic device 400, providing indications of input received on touch sensor device 406 and perhaps receiving information or instructions in turn. In exemplary embodiments, application 410 is an IM application enabling a user of the device 400 to interact with at least one other user, as discussed herein.

As discussed above, the haptic interface 414 is arranged to provide tactile feedback to a user of the client device. For example, the haptic interface 414 may be employed to vibrate mobile device 400 in a particular way when another user of a computing device is sending a communication, which is discussed below in relation to FIGS. 6-11. In some embodiments, and by way of a non-limiting example, processor 408 can receive an input signal, over a network from a server (or from the touch screen interface 402), determine a source or characteristics of the event and select the control signal based on the determination, and output a control signal to the haptic interface 414. The control signal is configured to cause the haptic interface 414 to output a haptic effect associated with the event. In some embodiments, the processor 408 will execute the control signal in accordance with instructions received from the server. For example, the haptic interface 414 will receive haptic code within control signals received over a network from a server or other device, and will output the haptic effect associated with the received control signal(s). Particular embodiments related to haptic effects will be discussed below in more detail.

Figure 5:
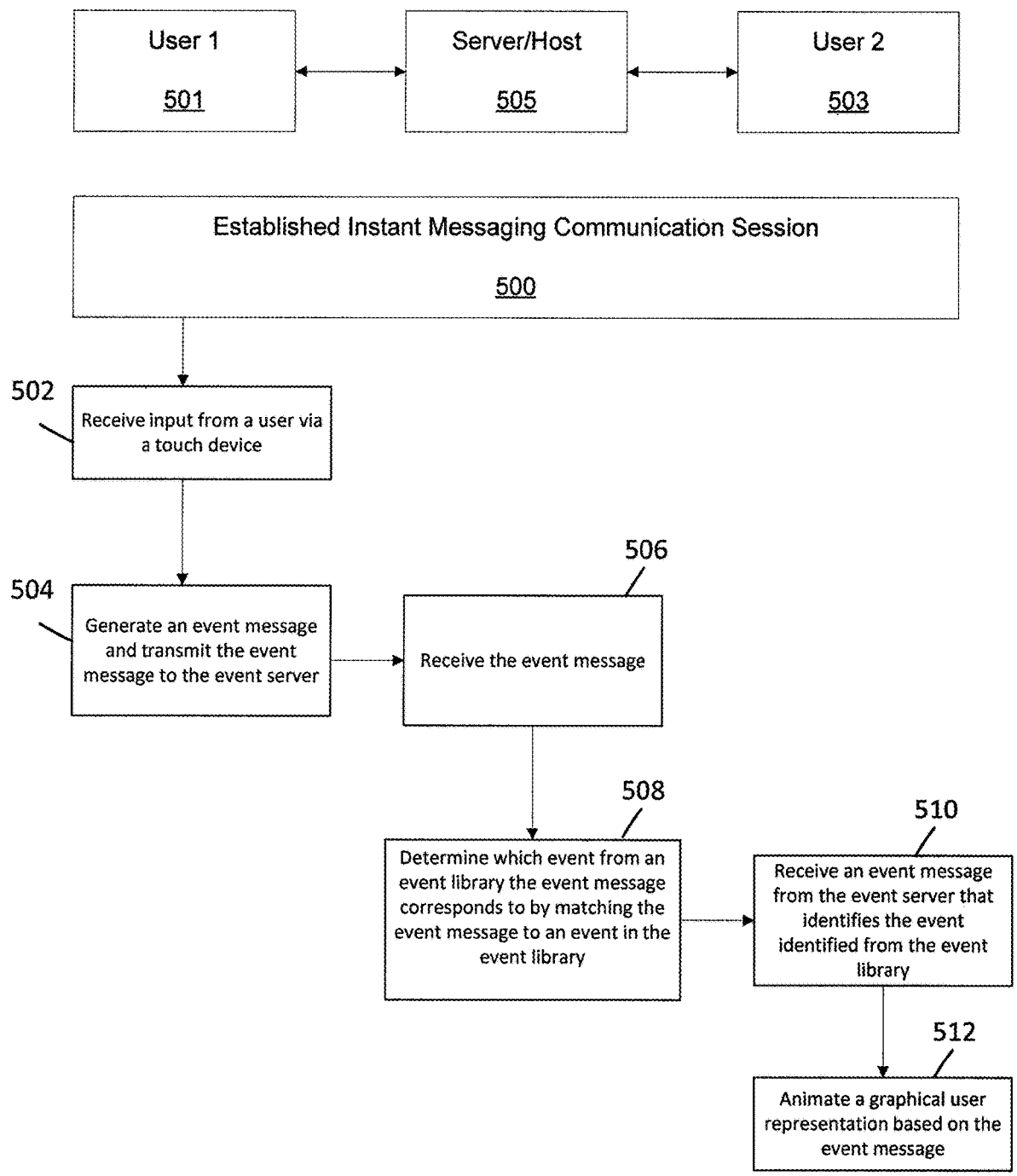
FIG. 5 is a flow chart of a process for manipulating or animating an avatar in accordance with some embodiments of the present disclosure.

FIG. 5 is a flow chart of a process for manipulating or animating an avatar during an instant messaging session 500 in accordance with some embodiments of the present disclosure. As discussed above, a user can effectuate a communication to a recipient user which triggers the recipient user's avatar to react. For clarity, the process of FIG. 5 will be discussed in relation to an example. It should be understood that the steps of the process and the occurrences within the example are illustrative in nature, and not limiting, binding or exhaustive regarding the steps, users or iterations involved. For example, user 501, Bobbi, has an established instant messaging session 500 with user 503, Roman, where Bobbi 501 and Roman 503 are communicating over a network hosted by server/host 505. In the example, Bobbi and Roman are dating, and Bobbi wants to send Roman a message stating that she hopes he feels better because she has just learned Roman is feeling ill. Both Bobbi and Roman have each other's avatar displayed on each of their respective devices. That is, within the chat interface, Bobbi's avatar is displayed on Roman's device, and Roman's avatar is displayed on Bobbi's device. (Depictions of the display of such avatars can be found in FIGS. 9-11, e.g., 1000a and 1000b in FIG. 10.) Each avatar is a graphical image that represents each user for self-expression in the instant message communications session 500. In some embodiments, an avatar can support a predetermined number of animations corresponding to emotions/moods, e.g., normal (or straight face), smiling, happy, sad, and angry. However, additional moods and/or gestures known or to be known within a virtual landscape can also be realized. It should be understood that the length, frequency and type of animation related to an emotion/mood of an avatar can be predetermined (either set by the user, device and/or system), or based upon the received input effectuating the animation.

Turning to the example illustrating the process of FIG. 5, instead of being constrained to sending a conventional text message stating "I hope you feel better" or inputting an emoticon representing the same, such as a "sad face," Bobbi can interact with Roman's displayed avatar, which is displayed on her device 501, and send Roman a message expressing her emotion. Step 502. For example, Bobbi can provide input on her device respective of Roman's displayed avatar. For example, Bobbi can place her finger, e.g. index finger, thumb or some combination thereof, on Roman's displayed avatar. It should be understood that interaction with a displayed avatar can take many forms, including, but not limited to, tapping, swiping, pinching, wiggling, double tapping, and other known or to be known interactions with a touch screen interface.

Here, Bobbi has placed his finger (1001 from FIG. 10) on the avatar 1000a and wiggled his finger, as illustrated in screen 1004 in FIG. 10. (In another example, Bobbi can "pinch" the avatar by depressing two fingers on Roman's displayed avatar and squeezing her two fingers together, as illustrated in screen 908 in FIG. 9). The interaction with the avatar triggers the generation of an event trigger, signal, or event message, to be sent over the network to Roman. Step 504. The event message is transmitted from Bobbi's device to a host, or event server (associate with an event database). Step 506. The event message is processed by the event server. Step 508. That is, the event server receives the event message and determines which event the event message corresponds to by matching the event message to a specific event within an event library. That is, the information contained in the event message, which includes data associated with Bobbi's interaction with her touch screen interface, is identified (or parsed out) and compared against a library of events. This may be accomplished by using a database table, a list, or a file that associates one or more triggers with a type of animation for the avatar to identify a particular type of animation. Types of animation include, by way of example and not limited to, a smile, a wink, a frown, an expression with a tongue out, a shocked expression, a kiss, a hug, a yell, a big smile, a sleeping expression, a nodding expression, a sigh, a tickle, a sad expression, a cool expression, a laugh, a disappearance, a smell, dancing, or a negative expression. It should be understood that the animations applicable to the present disclosure include those that are known or to be known within the scope of animating, modifying, manipulating, distorting, and the like, images, graphics, videos and/or multimedia files. Also, the event library can be housed within the event server, event database, client device or some combination thereof. Thus, it should also be understood that animations can be predetermined by a user, a content provider, the system, or some combination thereof. In some embodiments, the information contained in the event message may not need to be compared against a library of event. In these embodiments, the information can be identified and utilized in creating a customized event message (or control signal) for transmission to the recipient's device.

In some embodiments, the event library is stored locally on the sender's device. In other embodiments, the event library is stored locally on the recipient's device. Native event libraries are useful for embodiments where the communications are occurring directly between devices, such as with infrared, Near Field Communications (NFC), when one device is acting as a proxy or hosting a local hotspot, or the like. In some embodiments, the event library corresponds to an event database that is affiliated with an event server. It should be understood that the event server can be a separate sever, or a server hosting the chat session, such as the messaging server 107 from FIG. 1 or within the core system 220 from FIG. 2. Alternatively, the event server can be another server, such as the content server or application server, or a combination of applicable servers providing chat services or avatar resources.

In Step 510, after the event is identified based on the transmitted event message from the sender's device (e.g., Bobbi's device), an event message is communicated to the recipient's device (e.g., Roman's device). The message contains signals or instructions to modify, manipulate or manage animations of Roman's avatar which is displayed on Roman's device 503. Step 512. The signals/instructions include information related to the type of animation, modification or manipulation, the duration of such, and where applicable, the frequency of such. Also, the scope of such animation, manipulation or modification is comprised within the message. In the above example, the avatar on Roman's device would be animated, as per the event message, to signify that Roman has been "hugged." In some embodiments, in accordance with the "hug" event, Roman would receive a message that states "you have been hugged." In some embodiments, Bobbi may also receive a message stating "you have hugged Roman." An illustrating example of the process and example discussed above for FIG. 5 is illustrated in FIGS. 9-11, specifically in FIG. 10. In some embodiments, as discussed in FIGS. 6-8, the "hug" can also trigger Roman's device to shake, thereby effectuating the haptic effects of the "hug."

In an alternative embodiment, a sender can trigger an animation on a recipient's device by typing a message, whereby the message is parsed, and analyzed to identify an event trigger resulting in an event message, as discussed above. For example, the text of an instant message sent by the sender may trigger an animation of the recipient's avatar. Also, the text of an instant messages sent by the instant message recipient to the sender may trigger an animation of the sender's avatar. For example, the text of a message may include a character string "LOL," which is an acronym that stands for "laughing out loud." The character string "LOL" may trigger an animation in the sender avatar or the recipient avatar such that the sender avatar and/or the recipient avatar appear to be laughing.

Therefore, the ability to dynamically change the mood and/or gestures of the avatars provides a unique way to allow users to express their simulated mood and/or to express a simulated gesture. Using the dynamic moods of the avatars, users are afforded the ability to express themselves without resorting to the use of static imagery, or cumbersome functionality, such as web cameras where the users are allowing the other users to see them. For privacy reasons and/or resource reasons, avatars serve as simulated representations of the users that allow the users to express themselves freely. The dynamic nature of the avatars enhances the user's interactive experience while maintaining privacy.

Figure 6:
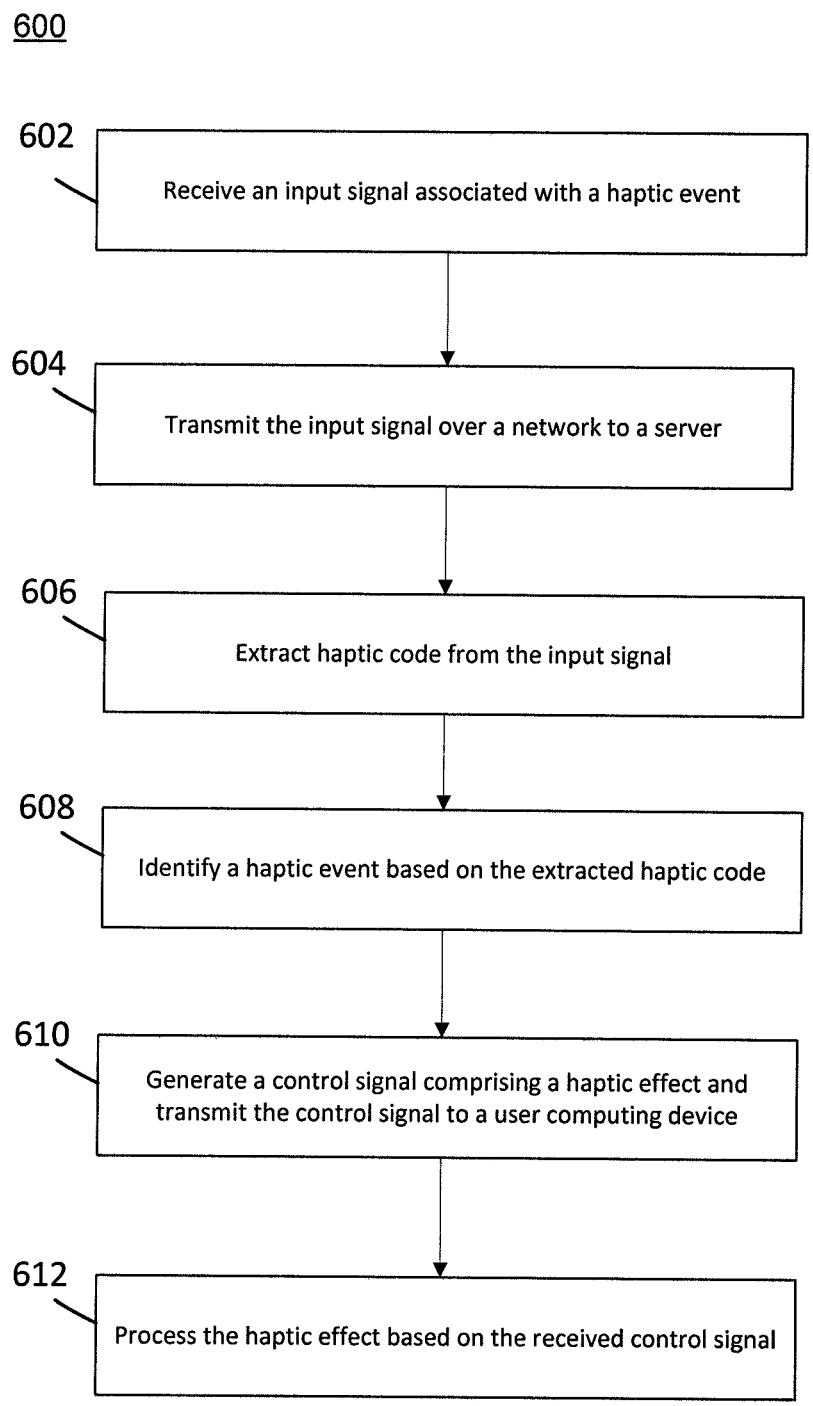
FIG. 6 is a flow chart of a process for manipulating an avatar using haptic technology in accordance with some embodiments of the present disclosure.

FIG. 6 is a flowchart depicting a method of using customized haptic effects to convey information to users of mobile communication devices, according to an embodiment of the present disclosure. As discussed above, a user can effectuate a communication to a recipient user which triggers the recipient user's avatar to react. In this embodiment, the reaction of the user's avatar causes the recipient user's device to produce a haptic event. Such event can be a vibration, audio alert, or a combination of the two. Additionally, in connection with the reaction produced from the embodiment in FIG. 5, the haptic event can occur simultaneously with the animation of the recipient's avatar, which will be discussed in FIG. 8.

As discussed herein, a mobile device, such as a smartphone, PDA or tablet computing device may be configured to allow a user to include haptic information or a haptic code in an outgoing communication signal, e.g., a text message. The encoding of a communication signal with haptic information may be based on an established scheme or protocol, and/or on a per-system basis. The haptic code is configured to cause a haptic effect to be output when the communication signal is delivered to another mobile device. In some embodiments, specific haptic code is associated with distinct haptic events, e.g., particular vibration patterns.

FIG. 6 illustrates a process 600 for using customized haptic effects to convey information to users on their mobile devices. At step 602, an input signal associated with an event is received, where the input signal comprises information related to a haptic event. For example, Bobbi provides input via the touch interface of her mobile device by tapping on Roman's displayed avatar. Bobbi's interaction corresponds to her desire to "hug" Roman. In step 604, the input signal is transmitted to a server. The input signal, which comprises information identifying the haptic event "hug" is processed by the server. Step. 606. That is, server extracts haptic code from the input signal. The haptic code provides information to the server identifying the specific input provided by Bobbi. In step 608, the server identifies a haptic event based on the extracted haptic code. That is, for example, the information contained in the haptic code, which includes data associated with Bobbi's interaction with her touch screen interface, is compared against a library of haptic events. This may be accomplished by using a haptic library, or database table, a list, or a file that associates haptic code with a type of haptic event. As with the event server/database discussed above in FIG. 5, the haptic library can be located on a server, associated or independent database, or on one of the communicating devices. As noted above, specific haptic code can be associated with distinct haptic events, e.g., a particular vibration patterns in order to simulate the desired effect. In some embodiments, the haptic code may be configured according to a predetermined scheme or protocol that includes, for example, a table of haptic codes (some of which may be associated with one or more haptic events) versus control signals for rendering the corresponding haptic effects. In this way, a processor in the mobile device can look up the corresponding control signal from the table based on the extracted haptic code, and output the selected control signal to a haptic interface for rendering the desired haptic effect. Alternatively, the haptic code need not be compared against a library of codes/events, in that the haptic code can be utilized or implemented in generating an event control signal for outputting a haptic event, as discussed below. It should be understood that, according to some embodiments, haptic effects can be predetermined by a user, a content provider, the system, or some combination thereof.

Types of haptic events include, but are not limited to: vibrations, pulses, tones, auditory effects, and the like, whereby the vibrations, pulses, tones can vary force, length, duration, frequency, repetition and volume. For example, Bobbi intends to "hug" Roman. The haptic code extracted identifies the desired "hug"; therefore, the haptic effect identified in the haptic library relates to a particular vibration pattern—which for example can be two quickly repeated pulses (or two 0.3 second pulses within a 1 second time frame, for example). Haptic effects (along with associated control signals) may also be downloaded or transmitted from a remote source, such as a service provider, a network resource, a Web server, a remote handheld communication device or computer. Such downloaded or transmitted haptic effects can be further edited or modified. It is envisioned that third-party applications for handheld communication devices may enable users to purchase and download additional haptic effects as well as to edit and modify them. Additionally, users may be able to customize or modify such haptic effects. The haptic effects may also be provided in the form of a bundled package that also includes visual effects and audio effects which may or may not be configured to be synchronized with the haptic effects.

In step 610, the server generates a control signal including the haptic effect, and transmits the control signal to another mobile device. For example, the control signal is transmitted to Roman's device. Upon reception at Roman's device, the haptic interface (or actuator) on Roman's device analyzes the control signal, and processes the haptic effect (or feedback). Step 612. That is, the control signal is configured to cause the haptic interface to output the haptic effect. In some embodiments, the haptic effects can also be triggered by, or synchronized with, other occurrences, as discussed below in FIG. 8.

In an exemplary embodiment, some of these haptic codes may be associated with haptic effects that emulate expressions or behaviors, such as "laugh," "giggle," "tickle," "hug," "high-five," "heartbeat," "pet purring," etc. This allows haptic effects to be transmitted and experienced, e.g., in an interactive conversation or a chat session, by pressing or manipulating displayed objects or portions on a touch screen interface. It should be understood, that the present disclosure is not limited to use on touch mobile devices, as the functionality discussed herein can be effectuated on any known or to be known device via input functionality/capabilities present on such devices.

By way of a non-limiting example, suppose that user Bobbi is engaged in a chat session with James via their respective mobile phones. In one embodiment, when Bobbi tells James a joke, instead of responding by typing text signifying laughter, such as "haha", or inserting and sending an emoticon smiling within a message, James can respond by sending a "laugh" sensation to Bobbi, e.g., by pressing on the touch screen interface area respective of the Bobbi's displayed avatar, as discussed above. This causes a signal to be transmitted from James' phone to Bobbi's phone, and a corresponding haptic effect to be output to Bobbi's phone (and thereby experienced by Bobbi).

In accordance with alternative embodiments, James may also be able to include a haptic code in an outgoing message (which may also contain a video image such as a picture taken by his mobile phone, and/or a graphical feature such as an emoticon emulating a smiley face) to be transmitted to Bobbi. The haptic code causes a haptic effect to be output when the message is delivered to a remote device such as Bobbi's mobile phone. In accordance with one embodiment, the haptic effect may be correlated or synchronized with the displaying of a video image contained in the message. In accordance with another embodiment, the generation of the haptic effect based on the haptic code may be carried out in a manner similar to that described above with respect to the embodiments discussed herein.

Haptic effects can also be used to enhance and complement the information content communicated between mobile communication devices. In accordance with some embodiment, a plurality of handheld communication users may be engaged in a chat session via their mobile communication devices. As discussed herein, the users may each have a graphical user representation or avatar displayed on other mobile communication devices. Such avatars can also be haptically enabled, for example, whereby their expressions and/or behaviors are accompanied and enhanced by corresponding haptic effects. FIG. 7 is a flowchart 700 depicting a method of carrying out a chat session using handheld communication devices, according to some embodiments of the present disclosure. In an embodiment, a mobile device receives an input signal associated with a chat message at step 702. The mobile device displays an avatar associated with the chat message at step 704. At step 706, the handheld communication device provides a haptic effect associated with the chat message. Step 706 may include outputting a control signal to a haptic interface coupled to the handheld communication device, where the control signal is configured to cause the haptic interface to output the haptic effect. In accordance with one embodiment, the haptic effect may be correlated with an expression or behavior of the avatar, such as a laugh or giggle, a cry, a scream, dancing, a pet purring, or the like. The steps of processing the haptic effects are processes in a similar manner discussed above in relation to FIG. 6.

Figure 8:
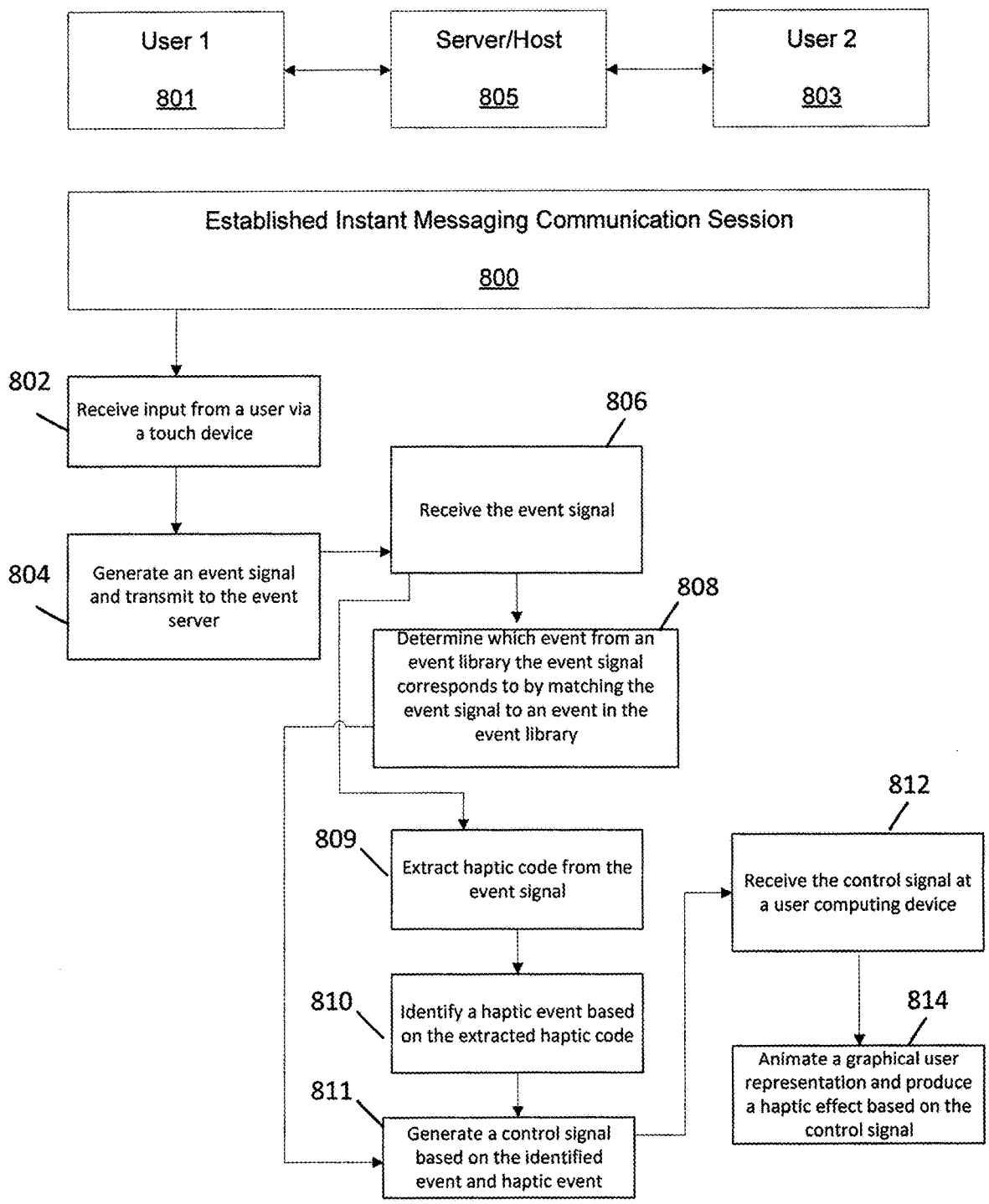
FIG. 8 is a flowchart of a process for manipulating or animating an avatar and using haptic technology in accordance with some embodiments of the present disclosure/

FIG. 8 is a flow chart of a process for manipulating or animating an avatar during an instant message and providing an associated haptic effect in accordance with some embodiments of the present disclosure. FIG. 8 illustrates an embodiment where the processes of FIG. 5 and FIG. 6 are occurring in concert with one another, where a triggered event signal comprises information related to a desired avatar reaction and a corresponding haptic effect.

As discussed above, a user can effectuate a communication to a recipient user which triggers the recipient user's avatar to react. Additionally, the avatar's reaction can be coupled to, or connected with a haptic effect. From the examples used in FIGS. 5-6, user 801, Bobbi, has an established instant messaging session 800 with user 803, Roman. Step 800. Bobbi and Roman are communicating over a network hosted by server/host 805. As with the above example, Bobbi wants to send Roman a message stating that she hopes he feels better. Both Bobbi and Roman have each other's avatar displayed on each of their respective devices. That is, within the chat interface, Bobbi's avatar is displayed on Roman's device, and Roman's avatar is displayed on Bobbi's device. In step 802, Bobbi can interact with Roman's displayed avatar and send Roman a message expressing her emotion. That is, Bobbi can provide input on her device respective of Roman's avatar. For example, Bobbi can place her finger, e.g. index finger, thumb or some combination thereof, on Roman's displayed avatar. It should be understood that interaction with a displayed avatar can take many forms, including, but not limited to, tapping, swiping, pinching, double tapping, and other known or to be known interactions with a touch screen interface.

In this example, Bobbi has "pinched" the avatar by depressing two fingers on Roman's displayed avatar and squeezing her two fingers together. The "pinch" triggers an event signal, or event message, to be sent over the network to Roman. Step 804. The event signal is transmitted from Bobbi's device to a host, or event server (an associated event database). Step 806. The event signal is processed by the event server (as discussed in FIG. 5). Step 808.

Additionally, as discussed in FIG. 6, the event signal can also comprise information identifying the haptic event "hug", which is also processed by the server 805. Step 809. That is, server extracts haptic code from the event signal. The haptic code provides information to the server identifying the specific input provided by Bobbi. In step 810, the server identifies a haptic event based on the extracted haptic code. That is, for example, the information contained in the haptic code, which includes data associated with Bobbi's interaction with her touch screen interface, is compared against a haptic library of haptic events. As discussed above, this may be accomplished by using a database table, a list, or a file that associates haptic code with a type of haptic event.

In step 811, after the event is identified in the event library and haptic library, the server generates a control signal which is transmitted to the recipient's device (e.g., Roman's device). It should be understood that the event library and haptic library discussed above can be within a single database or lookup table, or in separate, but connected databases or lookup tables. Additionally, in some embodiments, identifying the desired event or haptic effect can be based upon, sequentially identified or simultaneously determined in accordance with the other respective library.

The control signal contains signals or instructions to modify, manipulate or manage animations of Roman's avatar, and includes an associated the haptic effect. Upon reception at Roman's device, Step 812, the avatar on Roman's device would be animated, as per the control signal, to signify that Roman has been "hugged." Additionally, and in an exemplary embodiment, simultaneously, the haptic interface (or actuator) on Roman's device outputs the haptic effect. Step 814. In some embodiments, the control signal comprises both the information for the animation and the information for the haptic effect. In some embodiments, more than one control signal may be transmitted respective of the information for the animation and the information for the haptic effect.

Alternative embodiments also exist relating to providing input, or generating an input signal on a mobile device. In addition to interacting with a touch screen interface, a user can also effectuate input by, for example, tilting the device at a predetermined angle, or shaking the device with a predetermined force, so as to register an ascertainable input and direction, which can be recognized as user input. The input can be based upon the direction, speed, velocity, acceleration, length of a tilt or shake, or some combination thereof, in addition to being based upon the angle of the tilt and/or force of such shaking of the device. Therefore, tilting and/or shaking the device can produce a user input (effectuating similar input as that of touching a touch screen interface) provided it is configured with acceleration and/or position and/or velocity sensors known in the art or later to become known.

To illustrate the embodiments and capabilities discussed above, specifically discussed in relation to FIGS. 5-8, FIG. 9-11 depict various non-limiting implementations and examples of the present disclosure. It should be understood that the implementations and examples discussed for FIGS. 9-11 are illustrative in nature, and not limiting, binding or exhaustive regarding the steps, users or iterations involved FIG. 9 depicts a touch-screen mobile device 900, which through various implementations of screens 902-908, animations and haptic effects can be realized as discussed above in relation to FIGS. 5-8. As shown in screen 902, a user, via his/her finger (or styli) 903, can interact with a user's avatar 901. This interaction is an illustration of the input discussed in FIGS. 5-8. As a result of the interaction/input, screen 904 depicts one embodiment of a result of the interaction/input. As shown in relation to screen 904, on the user's device who has produced the input, an acknowledgement/notification 905 is displayed. For example, upon depressing on another user's avatar, and triggering a "tickle", the user receives an acknowledgement/notification 905 stating "you tickled Roman" next to their respective avatar 903. (Roman being the other user communicating with the sending user, Bobbi, as from the above examples). As discussed in detail above, the "tickle" produces an animation on Roman's device. In some embodiments, the user receiving the animation (or haptic effect) will also realize the result. Here, in screen 906, Roman's avatar 901, which is displayed on his screen, is animated to realize the "tickle." For example, Roman's avatar 907 may wiggle slightly and the device 900 may vibrate in accordance of the avatar's animation.

Screen 908 depicts an example of a type of interaction with an avatar via a touch screen interface of device 900. Here, a user, instead of merely tapping on the screen, can also "pinch" the avatar 901, as shown. (This is discussed in relation to the example/embodiment discussed above in relation to FIGS. 5 and 8.) In some embodiments, an avatar 901 will shrink in line with the "pinch" motion, and then "pop" back to normal size. This interaction/input, along with other types of interactions are known and understood in the art as capabilities and options for interacting with a touch screen interface/device. Therefore, it should be understood that known or to be known methods of interacting with a touch screen interface/device are applicable and able to be implemented in accordance with the present disclosure.

As discussed above, FIG. 10 depicts embodiments/examples 1002, 1004 and 1006 for "hugging" another user in accordance with functionality and capabilities discussed herein. The depictions in FIG. 10 are discussed above in detail related to FIGS. 5 and 8.

FIG. 11 depicts a touch-screen mobile device executing an instant messaging (IM) application, as discussed above. The user interface display 1100 shows an IM conversation between Bobbi and Roman. Each user's avatar 1104 and 1106 is displayed alongside their respective chat messages 1102 and 1103. As shown by way of example in the particular implementation presented above with relation to FIGS. 5-8, the avatars are pictures of their respective faces (although it should be appreciated that visually more intricate avatars may be employed). The user interface display 1100 of the device presented, by way of example in this figure, shows that the device enables the user to (i) enter and send messages, (ii) receive messages and (ii) dynamically manipulate the selected avatar (thereby effectuating an animation and/or haptic effect). As illustrated and discussed above, when a user's avatar is touched (or interacted with by a user—Bobbi or Roman), the device displays a message indicating the animation/haptic effect triggered, and a message indicating the type of animation/haptic effect 1105 and 1107.

As shown in FIG. 11, Roman 1104 notices that Bobbi 1106 has not responded to a text he sent a while ago. He wonders if Bobbi received the text, and wants to notify her in a fun, amusing way, as opposed to sending her repeated messages. Here, for example, Roman 1104 can press down with his thumb on Bobbi's avatar 1106 and then shake his device. Immediately, the screen displays an icon that shows an avatar shaking, and next to the icon it says "You shook Bobbi!" 1107. Thus, Bobbi's mobile device vibrates, and she checks her phone and sees that Roman "shook" her.

In another non-limiting example in accordance with some embodiments, Bobbi can interact with her own displayed avatar in order to express similar emotions. As with current text features, and understood to be applicable for purposes of this example, when users are having a conversation, each user's avatar is visible to each user and themselves. Instead of having to interact with the other user's avatar, Bobbi can place her finger on her own avatar on the touch screen of her mobile device. This can effectuate the same result as discussed above.

In some embodiments, in addition to manipulating an avatar, a user can also modify an avatar to produce an animation. For example, a user can manipulate or distort the face, or component of the face, of an avatar (or emoticon). For example, a user may insert a smiley face emoticon into a text message and then manipulate or distort the face or a component of the face (e.g. the smile) to broaden the smile into a grin, or twist the smile into an ironic smile. Similarly, the user can modify an avatar in a similar manner. This enables the user to personalize the avatar or emoticon rather than having to select the most appropriate emoticon from a palette of predefined emoticons. Therefore, a user is afforded the ability to modify graphical user representations in real-time to produce personalized moods, emotions, gestures and statements. It should also be understood, that the input and output effectuated via interaction with an avatar is not limited to the avatar as a whole. For example, interaction can be related to solely a component of an avatar, e.g., a person's smile or eyes, or even the background imagery within an avatar's display area.

It should be understood that although discussed above primarily with respect to instant message applications, other implementations are contemplated for providing similar functionality in platforms and online applications. For example, the techniques and concepts may be applied to an animated avatar that acts as an information assistant within games, on social networks, to convey news, weather, and other information to a user of a computer system or a computing device.

FIG. 12 is a block diagram illustrating an internal architecture of a computing device, e.g., a computing device such as server or user computing device, in accordance with one or more embodiments of the present disclosure. FIG. 12 illustrates a computer system upon which some exemplary embodiments of the present disclosure may be implemented. Although computer system 1200 is depicted with respect to a particular device or equipment, it is contemplated that other devices or equipment (e.g., network elements, servers, processors) within can deploy the illustrated hardware and components of system 1200.

As shown in FIG. 12, internal architecture 1200 includes one or more processing units, processors, or processing cores, (also referred to herein as CPUs) 1212, which interface with at least one computer bus 1202. Also interfacing with computer bus 1202 are computer-readable medium, or media, 1206, network interface 1214, memory 1204, e.g., random access memory (RAM), run-time transient memory, read only memory (ROM), media disk drive interface 1220 as an interface for a drive that can read and/or write to media including removable media such as floppy, CD-ROM, DVD, media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces and a universal serial bus (USB) interface.

Memory 1204 interfaces with computer bus 1202 so as to provide information stored in memory 1204 to CPU 1212 during execution of software programs such as an operating system, application programs, device drivers, and software modules that comprise program code, and/or computer executable process steps, incorporating functionality described herein, e.g., one or more of process flows described herein. CPU 1212 first loads computer executable process steps from storage, e.g., memory 1204, computer readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1228 typically provides information communication using transmission media through one or more networks to other devices that use or process the information. For example, network link 1228 may provide a connection through local network 1224 to a host computer 1226 or to equipment operated by a Network or Internet Service Provider (ISP) 1230. ISP equipment in turn provides data communication services through the public, worldwide packet-switching communication network of networks now commonly referred to as the Internet 1232.

A computer called a server host 1234 connected to the Internet 1232 hosts a process that provides a service in response to information received over the Internet 1232. For example, server host 1234 hosts a process that provides information representing video data for presentation at display 1210. It is contemplated that the components of system 1200 can be deployed in various configurations within other computer systems, e.g., host and server.

At least some embodiments of the present disclosure are related to the use of computer system 1200 for implementing some or all of the techniques described herein. According to one embodiment, those techniques are performed by computer system 1200 in response to processing unit 1212 executing one or more sequences of one or more processor instructions contained in memory 1204. Such instructions, also called computer instructions, software and program code, may be read into memory 1204 from another computer-readable medium 1206 such as storage device or network link. Execution of the sequences of instructions contained in memory 1204 causes processing unit 1212 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1200. Computer system 1200 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1202 as it is received, or may be stored in memory 1204 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

As discussed herein, a "username" is an identifier that may be composed of letters, numbers or symbols (collectively defined as alpha-numeric characters) that is used to gain access to, and uniquely identify, an account and/or a network. Generally, but not always, a unique username will be selected by the user that initially registers for use of a message account. Typically, a domain name identifies the provider of the message account for the user, and which is appended to the username and separated by the "@" symbol.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    initiating, via a server over a network, an instant messaging (IM) session between a first user and a second user;
    causing, over the network via the server, a first graphical user representation associated with the first user to be visibly displayed within a user interface (UI) of the IM session executing on a device of the second user;
    receiving, at the server, input from the second user device respective to a portion of the displayed first graphical user representation, said input comprising information indicating a type of interaction with the first graphical user representation and a desired modification of the portion;

determining, via the server, a type of action based on said type of interaction indicated by said input;

generating, via the server, a customized event message based on said type of action and the input, said customized event message comprising a modified animation to a portion of the graphical user representation of the second user; and transmitting, via the server, the customized event message to a device of said first user, the customized event message causing the modified animation of the portion of the graphical user representation of the second user that is displayed within the IM UI executing on the first device.

2. The method of claim 1, further comprising:

receiving input from the first user device respective to the displayed second user graphical representation, said input responsive to the first user performing a type of interaction with the second user graphical representation;

determining a type of action based on said type of interaction indicated by said input;

transmitting an instruction to the second user device, said instruction causing the first graphical user representation of the first user that is displayed within the IM UI executing on the second device to be animated according to said type of action.

3. The method of claim 1, wherein said customized event message further causes said first device to perform a haptic effect, wherein a type of said haptic effect is based on said type of action.

4. The method of claim 1, further comprising:

receiving, from said second user, a character message; and communicating said character message to said IM UI executing on the first device, wherein said character message is communicated along with said event message such that the graphical user representation of the second user is animated when the character message is received.

5. The method of claim 1, wherein the determination of the type of action based on the type of interaction indicated by the input further comprises:

analyzing said second user input, and based on said analysis, identifying an action performed during said input respective to said first graphical user representation; and identifying, from within an event library, interaction data corresponding to said action, wherein said interaction data indicates said type of interaction.

6. The method of claim 1, wherein said first and second graphical user representations are at least one of emoticons, avatars, graphics, icons, animations, images and videos.

7. The method of claim 1, wherein said input corresponds to a touch interaction with said first graphical user representation.

8. A non-transitory computer-readable storage medium tangibly encoded with computer-executable instructions, that when executed by a processor associated with a server, performs a method comprising:

initiating, via the server over a network, an instant messaging (IM) session between a first user and a second user;

causing, over the network via the server, a first graphical user representation associated with the first user to be visibly displayed within a user interface (UI) of the IM session executing on a device of the second user;

receiving, at the server, input from the second user device respective to a portion of the displayed first graphical user representation, said input comprising information indicating a type of interaction with the first graphical user representation and a desired modification of the portion;

determining, via the server, a type of action based on said type of interaction indicated by said input;

generating, via the server, a customized event message based on said type of action and the input, said customized event message comprising a modified animation to a portion of the graphical user representation of the second user; and transmitting, via the server, the customized event message to a device of said first user, the customized event message causing the modified animation of the portion of the graphical user representation of the second user that is displayed within the IM UI executing on the first device.

9. The non-transitory computer-readable storage medium of claim 8, further comprising:

receiving input from the first user device respective to the displayed second user graphical representation, said input responsive to the first user performing a type of interaction with the second user graphical representation;

determining a type of action based on said type of interaction indicated by said input;

transmitting an instruction to the second user device, said instruction causing the first graphical user representation of the first user that is displayed within the IM UI executing on the second device to be animated according to said type of action.

10. The non-transitory computer-readable storage medium of claim 8, wherein said customized event message further causes said first device to perform a haptic effect, wherein a type of said haptic effect is based on said type of action.

11. The non-transitory computer-readable storage medium of claim 8, further comprising:

receiving, from said second user, a character message; and communicating said character message to said IM UI executing on the first device, wherein said character message is communicated along with said customized event message such that the graphical user representation of the second user is animated when the character message is received.

12. The non-transitory computer-readable storage medium of claim 8, wherein the determination of the type of action based on the type of interaction indicated by the input further comprises:

analyzing said second user input, and based on said analysis, identifying an action performed during said input respective to said first graphical user representation; and identifying, from within an event library, interaction data corresponding to said action, wherein said interaction data indicates said type of interaction.

13. The non-transitory computer-readable storage medium of claim 8, wherein said first and second graphical user representations are at least one of emoticons, avatars, graphics, icons, animations, images and videos.

14. The non-transitory computer-readable storage medium of claim 8, wherein said input corresponds to a touch interaction with said first graphical user representation.

15. A server comprising:
a processor; and
a non-transitory computer-readable storage medium for tangibly storing thereon program logic for execution by the processor, the program logic comprising:
  logic executed by the processor for initiating, via a server over a network, an instant messaging (IM) session between a first user and a second user;
  logic executed by the processor for causing, over the network via the server, a first graphical user representation associated with the first user to be visibly displayed within a user interface (UI) of the IM session executing on a device of the second user;
  logic executed by the processor for receiving, at the server, input from the second user device respective to a portion of the displayed first graphical user representation, said input comprising information indicating a type of interaction with the first graphical user representation and a desired modification of the portion;
  logic executed by the processor for determining, via the server, a type of action based on said type of interaction indicated by said input;
  logic executed by the processor for generating, via the server, customized event message based on said type of action and the input, said customized event message comprising a modified animation to a portion of the graphical user representation of the second user; and
  logic executed by the processor for transmitting, via the server, the customized event message to a device of said first user, the customized event message causing the modified animation of the portion of the graphical user representation of the second user that is displayed within the IM UI executing on the first device.

16. The server of claim 15, further comprising:
logic executed by the processor for receiving input from the first user device respective to the displayed second user graphical representation, said input responsive to the first user performing a type of interaction with the second user graphical representation;
logic executed by the processor for determining a type of action based on said type of interaction indicated by said input;
logic executed by the processor for transmitting an instruction to the second user device, said instruction causing the first graphical user representation of the first user that is displayed within the IM UI executing on the second device to be animated according to said type of action.

17. The server of claim 15, further comprising:
logic executed by the processor for receiving, from said second user, a character message; and
logic executed by the processor for communicating said character message to said IM UI executing on the first device, wherein said character message is communicated along with said customized event message such that the graphical user representation of the second user is animated when the character message is received.

* * * * *